United States Patent [19]
Gallo et al.

[11] Patent Number: 5,563,959
[45] Date of Patent: Oct. 8, 1996

[54] CHARACTER RECOGNITION

[75] Inventors: Girolamo Gallo, Foggia; Giulio Marotta, Rieti, both of Italy

[73] Assignee: Texas Instruments Incorporated, Dallas, Tex.

[21] Appl. No.: 995,397

[22] Filed: Dec. 18, 1992

[30] Foreign Application Priority Data

Dec. 19, 1991 [IT] Italy ................................. RM91A0956
Oct. 23, 1992 [IT] Italy ................................. RM92A0776

[51] Int. Cl.⁶ ....................................................... G06K 9/00
[52] U.S. Cl. ........................... 382/187; 382/204; 382/218
[58] Field of Search .................................. 382/13, 26, 27, 382/59, 34, 187, 204, 205, 313, 314, 315, 218, 188, 189

[56] References Cited

U.S. PATENT DOCUMENTS

| | | | |
|---|---|---|---|
| 4,032,885 | 6/1977 | Roth | 382/34 |
| 4,429,414 | 1/1984 | Asakawa | 382/34 |
| 4,864,629 | 9/1989 | Deering | 382/34 |
| 5,050,219 | 9/1991 | Maury | 382/13 |
| 5,113,452 | 5/1992 | Chatani et al. | 382/13 |
| 5,157,737 | 10/1992 | Sklarew | 382/59 |

*Primary Examiner*—Leo Boudreau
*Assistant Examiner*—Phuoc Tran
*Attorney, Agent, or Firm*—William E. Hiller; Richard L. Donaldson

[57] ABSTRACT

This invention relates to a method and apparatus for recognizing a script written character. The character is entered using character entering means and digitised by appropriate means. The digitised character is then stored in, for example, a memory. Codes representing topological features of the character are extracted from the character, then the topological features of the character are compared with a set of reference topological features stored in a memory. Each of the set of reference characters corresponding with a specific script written character. A logic process is then performed to determine which of the set of reference features most closely corresponds to the topological features of the digitized character thereby identifying the script written character.

7 Claims, 15 Drawing Sheets

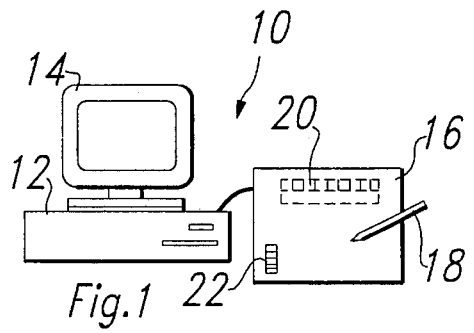
Fig.1
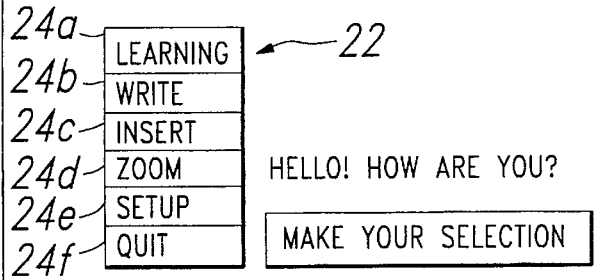
Fig.2
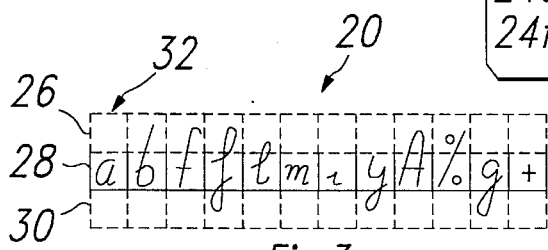
Fig.3
```
CHAR A
  STROKES 2
  POSITION 1 BOX (179 39) (212 89)
  STROKE 1 POINTS 44
    189 71      189 72
    189 71      189 70
    189 69      189 67
    189 65      189 64
    189 62      189 61
    190 59      190 58
    191 56      191 55
    192 54      192 53
    193 52      193 51
    194 50      195 49
    196 48      197 48
    197 47      198 47
    199 48      199 49
    199 50      200 52
    200 53      200 54
    200 55      201 57
    201 58      201 59
    201 60      201 62
    201 63      201 64
    201 65      201 67
    201 68      201 69
    201 70      201 71
  STROKE 2 POINTS 10
    192 64      191 63
    192 63      193 63
    194 63      195 63
    196 63      198 62
    199 62      200 62
```
Fig.4
```
CHAR A STROKES 2 FRAME 3
..........#####..
........###...#..
......##......##.
.....##........#.
....##.........#.
...#...........##
..##............#
..#.............#
.#.......######.#
.#...#######....#
.#..............#
.#..............#
.#..............#
.#..............#
.#..............#
.#..............#
.#..............#
.#..............#
```
Fig.5

CHARACTER RECOGNITION

This invention relates to a method and apparatus for character recognition, particularly the recognition of letters, numerals, signs and punctuation symbols.

In keyboardless input schemes for computer systems, for example, instructions or data can be input by the user of the system by means of a pen-like stylus on an input/output screen. An example of such a screen is a touch sensitive monitor. The input instructions or data can be handwritten script, numbers, or any other form of handwritten character. In these types of systems it is essential for the computer to "understand" the input it has been given by the user and to recognize and read the input characters.

There are a number of known systems capable of recognizing and reading input characters. One such system is disclosed in U.S. Pat. No. 4,972,496. This patent discloses a system including a transparent input screen that generates positional information corresponding to the positions at which a stylus contacts the screen (i.e. the positional information of the character) and also displays to the user the input that has been entered. The system further includes a computer which is programmed to compile the positional information into "Strokes" made by the stylus. The strokes are analyzed to identify the starting point of each stroke, the end of each stroke, the slope of the stroke, the stroke centriod, the rate of change of the slope, and where a character comprises more than one stroke whether it was the first, second, etc. Once the stroke has been analyzed a personalized data base which is unique to a specific user is accessed to identify the character which most closely corresponds to the character under analysis.

This system is relatively complex to implement using dedicated hardware due to the detailed stroke analysis which must be conducted. In addition it relies on a personalized data base for each user. This can mean that a large amount of memory is wasted if a given system is used by many users. If no personalized data base is set up the degree of recognition of the system can fall to an unacceptable level. Since this system relies on stroke analysis it is important for all users to write the characters in a predetermined conventional manner. Recognition is severely inhibited when the user adopts a writing style where the strokes are different from the predetermined conventional manner. Even though the free style characters may look very similar to the conventional characters, recognition may not be accurate since the stroke analysis indicates a different character than that which has been written.

One object of the present invention is to provide a character recognition system which overcomes at least some of the disadvantages of known systems.

Another object of the present invention is to provide a simple character recognition system which has improved recognition rate even when no personalized data base is utilized.

According to one aspect of the present invention there is provided a method of recognizing a script written character comprising the steps of entering the character using character entering means; digitising the character; storing the digitized character; extracting topological features of said character; comparing the topological features of the character with a set of reference topological features stored in the computer memory, each of the set corresponding with a specific character, and performing a logic process to determine which of said set of reference features most closely corresponds to the topological features of the digitized character thereby recognising the script written character.

The system of the invention has the advantages that there is no need for time consuming and complex stroke analysis of the character and that a data base will provide recognition of about upwards of 95% of all characters input by a user.

According to a second aspect of the present invention there is provided apparatus for recognizing a script written character comprising character entering means for entering and receiving the characters; digitising means for digitising the characters; storage means for storing the digitized characters; topographical feature extracting means for extracting topographical features representative of the character, means for comparing the topographical features of the character with a set of reference topographical features, each of which corresponds to a specific character, and logic means for identifying which of said set of reference features most closely corresponds to the topographical features of the digitized character, thereby recognising the script written character.

According to a third aspect of the present invention there is provided a circuit for extracting geometrical features from digital patterns representing characters as a function of elementary geometrical patterns, substantially comprising: a K-location buffer memory operating as an input buffer; a storage and comparison array consisting of storage and comparison cells arranged as N rows by K colunms, which receives K column inputs from said buffer memory, compares such data to data preliminary stored therein and provides n digital row outputs; a buffer memory operating as an output buffer which receives in parallel format said N digital outputs of the storage and comparison array and issues them as a N-bit serial string; a decoder for addressing the rows of said storage and comparison array; and a control logic for driving said buffer memories acting as input and output buffers, as well as said address decoder.

Reference will now be made, by way of example, to the accompanying drawings, in which:

FIG. 1 is a block diagram of a character recognition system according to one aspect of the present invention;

FIG. 2 is a diagram of an example of a program memory displayed on the screen of the system;

FIG. 3 is a diagram showing some examples of characters with frame constraint defaults;

FIG. 4 is a diagram of an ASCII format of the character A;

FIG. 5 is a diagram of a pattern format of the character A;

FIGS. 6a–6h are diagrams showing a topological feature set used to identify any character;

FIGS. 7 and 8 are diagrams for showing how the character is recognized; and

FIG. 9 is a flow chart illustrating the punctuation recognition process;

Figures 8, 9:
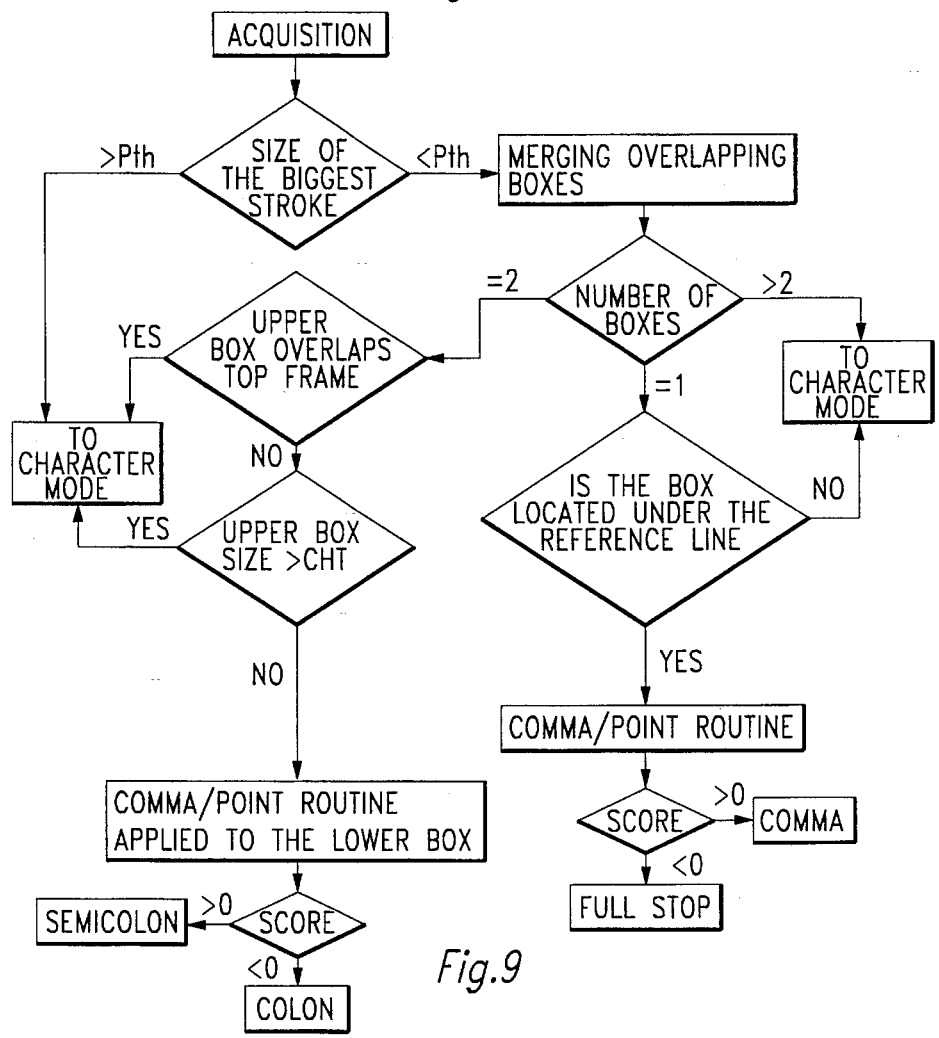

Referring to FIG. 1 a character recognition system is shown generally at 10. The system comprises a microcomputer 12 having a monitor 14. The computer is connected to a touch sensitive screen, for example an LCD graphic digitizer 16. It is possible to replace the monitor with a touch sensitive monitor and dispense with the separate touch sensitive screen. A pen-like stylus 18 may be used on the touch sensitive screen to input instructions, data or the like to the computer. A user can write commands directly onto the screen. For the most accurate recognition of the commands the characters should preferably be entered in a frame shown generally at 20. The touch sensitive screen menu used by the user to enter information is shown in FIG. 2. The main options available are shown in blocks 22 and may be activated by touching the stylus on the appropriate box 24a-f.

The frame 20 is shown in greater detail in FIG. 3. It comprises a top frame 26, a middle frame 28 and a bottom frame 30. Each character should be entered into one column 32. The position of the character is used to aid in the recognition of that character. For example "short" lower case letters such as a, c, e, m, n, o, r, s, u, v, w, x and z should be entered in the middle frame and should preferably be of such a size that they do not extend into the other frames. Taller lower case letters such as b, d, f, h, i, k, l, and t should have a larger vertical size than the smaller lower case letters and should be entered in the top and middle frames. Lower case letters with "tail" such as g, j, p, q and y should preferably be entered such that the tails extend into the bottom frame. Upper case letters and numbers should generally be entered in the top and middle frames of any given column 32. Other characters such as punctuation for example should be entered in their normal positions relative to the alphanumeric characters.

Adhering to the frame constraints illustrated above allows the system to recognize the difference between "c" and "C" for example. It is possible for the operator to set the size of the frames or to use the standard frame. In addition for different alphabets such as Japanese characters the frame constraints will obviously be suited to facilitate recognition of those characters. The full detail of how the frame constraints aid recognition will be described in more detail below.

Once the handwritten data has been entered on the LCD graphic digitizer 16 the output of the digitizer is downloaded to the computer into what is called a stroke format file (STK file). In such a format the character is described by a sequence of strokes each of which is made up of a series of coordinates between a pen-down and pen-up condition. FIG. 4 shows an ASCII format translation of the content of a stroke file in binary form of the letter A. The output from the digitizer is then "pre-processed" before character recognition is implemented. This pre-processing comprises character scaling, centering, digital noise filtering and fitting the digital information into a pixel matrix of a given size, for example, a 16×16 matrix.

After pre-processing the character undergoes a recognition process which comprises two basic steps:

extraction of the topological characteristics (features) of the input handwritten character; and recognition by 'fuzzy' comparison with a set of reference characters stored in a memory.

The handwriting recognition is performed on each individual character once it has been written. This allows for total freedom in writing the characters according to the user's style, i.e. it is not necessary to enter the character as a particular sequence of strokes. This can allow for variations in the direction of movement of the pen and corrections can be effected after the characters have been originally written. The recognition is mainly based on symbol's optical characteristics. If there are any ambiguities such as between for example "S" and "5" the actual number of strokes used to make up the character is used to solve the ambiguities, i.e. in this case one for the S and two or more for the 5. As previously stated, the recognition of uppercase and lowercase letters with the same shape (e.g. 'c' and 'C') is improved by the user writing in fields or frames.

This particular system is optimized for characters as well as all other signs usually found in a standard computer keyboard. However, the principle is equally valid for Japanese or other alphabets, for example. The system can be used in a writer dependent mode, in which it shows better recognition rate. However, very good recognition is possible when used as a writer-independent system, i.e. without the system training. The user can enter his own reference character set through a user friendly character mode. Once adequately trained, the system can accept any handwriting style. For example, one user may train the system to recognize multiple character styles for a given alphabet letter, or his special way of writing a given character. Alternatively, the system can be used in "untrained mode" with a standard set of characters.

The pre-processing initially converts the STK format described above to a pattern (PTN) format of a normalized 16×16 matrix. This PTN format is shown in FIG. 5. The remainder of the character pre-processing is carried out as follows:

Point Interpolation/Smoothing occurs as the digitiser converts points at a constant rate, the distance between two consecutive points is proportional to the pen speed. If the writing speed is low, some points can be very close to each other resulting in a digitising noise. Alternatively, if writing speed is relatively fast, points can be well spaced from each other, leaving holes in the stroke. To overcome this drawback, an interpolation/smoothing routine is used to add interpolated points whenever points are too far apart and remove points which are too close together.

Character boundaries are evaluated and the points are scaled to fit into a normalized 16×16 matrix. X and Y components are scaled with different scaling factors to completely fill the matrix. If the ratio of either X-size/Y-size or Y-size/X-size is larger than a given threshold value (typically 4) only the larger component (X or Y) of the character is scaled. This is to avoid improper expansion of 'slim' characters such as "I" or "-"; and Character mapping which involves the number of points belonging to each of 16×16 pixels being counted and their average value computed. A threshold value (about ⅛ of the average value) is used to establish if a given pixel of the matrix is to be black (1) or white (0). If the number of points in a given pixel is greater than the threshold, the corresponding bit is set to 1, otherwise it is set to 0. Additional data are added to the character matrix to specify the character identifier (only available if the character is a member of the reference set), these data include the number of strokes of the character and the frame position. This information will be used during the recognition process, as will be described below. The frame position is coded by assigning a score to each of the three writing frames: 1 for the top frame 26, 2 for the central one 28, and 4 for the bottom one 30. For instance, character 'g' is normally written in the central and bottom frames, so its frame number will be 2+4=6. Frame numbers are evaluated by checking the character position on the writing field. In order to disregard small framing errors by the user, the active area of the top and bottom fields is actually slightly smaller than indicated by the frame lines. This means that the actual boundary between the central and top frame is slightly higher than shown and the boundary between the central and bottom frame is slightly lower than shown. The amount of this shifts may be adjusted by the user. The result of the character pre-processing stage is a 16×16 matrix in pattern format, each element of the matrix being a pixel of the character image. Allowed values for the given element are 0 (white pixel) and 1 (black pixel) as is shown in FIG. 5. At the top of the matrix is a header data line containing the following information:

a) Character identifier (available only if the character is a member of the reference set);

b) Number of strokes; and c) Frame positioning.

The first step of the recognition process consists in extracting from the original 16×16 matrix a topological description or code of the character. Recognition is then performed by comparing input character code with the codes of the reference characters collected by the user during the learning phase or from the standard set in the memory. The code basically contains three types of information:

i) Feature extraction code;

ii) Intersection code; and iii) Frame position, stroke number and character identifier (the latter only being available if the character is a member of the reference set).

Feature extraction is the key step of the recognition algorithm. It performs a faithful description of character's topology to make recognition very accurate. This operation is performed by using a 'topological feature set'. It consists of the 99 16×16 matrices shown in FIGS. 6a–6h representing elementary geometrical structures. These matrices have been obtained through a complex work of optimization performed using several character sets from many different people.

The feature extraction process basically consists of overlapping the character to the i-th (i=1, ..., 99) feature matrix and then counting the number of black pixels they have in common. This operation can be easily implemented by means of a bitwise AND function. The counting result X is then compared with three threshold values, T1, T2, T3;

if $X <= T1$ the response fi of the i-th feature is set to 0 if $T1 < X <= T2$ the response fi of the i-th feature is set to 1 if $T2 < X <= T3$ the response fi of the i-th feature is set to 2 if $X >= T3$ the response fi of the i-th feature is set to 3

Figure 7:
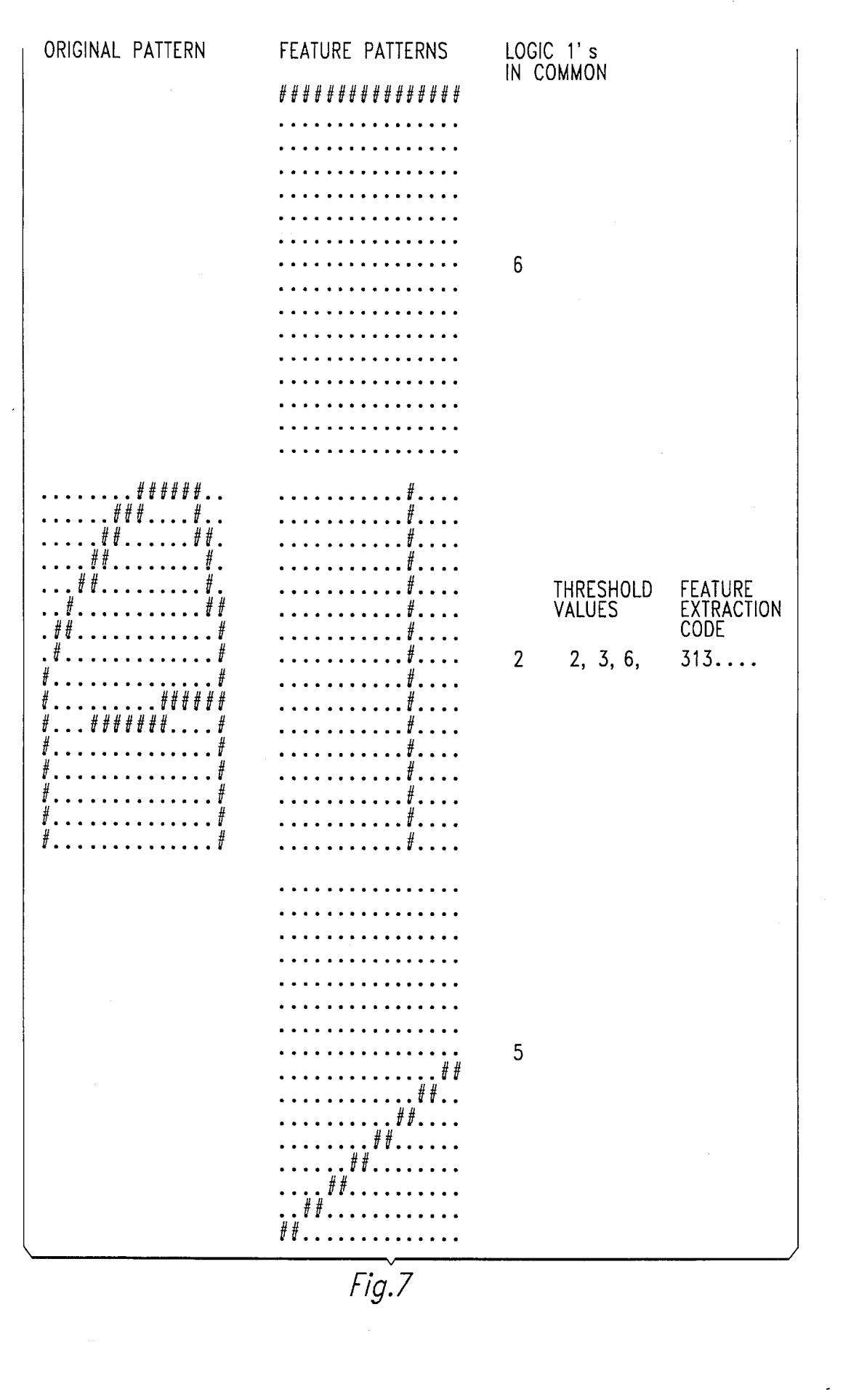

This process is shown in FIG. 7. Therefore, the result of the described operation is an array of 99 integer values called feature extraction code representing the response of the feature set to the given character. T1, T2, T3 are chosen from simulations of the system and are typically set to be T1=2, T2=3, T3=6.

The intersection code contains additional information on the character topology. It consists of 32 integer values Ni (i=1, ... 32), each of the them being the number of intersections of the character with the 16 horizontal and the 16 vertical lines of the matrix. An example of this operation is shown in FIG. 8.

The last field of the character code contains the frame position, the number of strokes of the character and, if the character is a member of the learning sets, its identifier, provided by the user.

Therefore, after the coding process a given character is represented by an array of 133 integers: 99 from feature extraction, 32 from intersections, 1 for stroke number and 1 for frame position.

Recognition is performed by comparing bit-by-bit the code of the unknown input character with the coded characters in the reference set having the same frame number. Characters with frame numbers different from that of the input character are disregarded during the comparison. This has two important advantages. First, it allows recognition of characters with the same shape and different size. Secondly, the recognition process is relatively faster because it involves a lower number of comparisons. As a result, the score Sj assigned to the j-th comparisons (j=1, ..., Ncar) is given by:

$$Sj = SW*|S - Sj| + \sum_{i=1}^{99} |fi - fij| + IW* \sum_{i=1}^{32} |Ni - Nij|$$

where:

S=stroke number of the input character

Sj=stroke number of the j-th reference character fi=response of the i-th feature to the input character fij=response of the i-th feature to the j-th reference character Ni=number of intersections of the i-th line with the input character Nij=number of intersections of the i-th line with the j-th reference character SW=stroke weight IW=intersection weight This score is evaluated for each of the Ncar reference characters. The identifier of the reference character with the minimum score is assigned to the unknown input symbol.

The learning process which may be used to educate the computer of the handwriting styles of the user is explained in more detail below. If the user does not wish to educate the system he may rely on recognition being effected by virtue of a reference set either permanently stored on the system or that of another user.

The Learning process consists in collecting a suitable number of examples for each symbol the user wants to be recognized. These symbols will form the reference set during the recognition process. Two different learning (or training) modes are available. The first is known as the built-in learning mode. In this mode, the program requests the user to write examples of the symbols listed in a command file. This file contains a complete list of the symbols to be recognized with the corresponding frame constraints. The list of the symbols and the frame constraints can be changed by the user, depending upon the symbols he/she wants to be recognized and his finer handwriting style. Multiple frame constraint values are allowed for each symbol. In order to avoid insertion of bad characters in the learning set the program will reject characters with frame positions different from that stated in the file.

The second mode is the interactive learning mode. The user writes symbols in the order he/she likes. Then recognition is performed. Each time the recogniser fails, unrecognized symbols are automatically inserted in the learning (or reference) set. Also, characters with not allowed frame positions will be rejected.

After the built-in learning mode has been run, the recognition capability can be further improved by adding other characters to the learning set through the interactive learning mode.

In addition to the recognition of characters the system can also recognize punctuation symbols. The system can perform recognition of symbols such as commas, colons, semicolons, full stops, etc. This recognition process does not require any learning, therefore punctuation recognition is completely user independent. The flow chart of the process is shown in FIG. 9.

After acquisition, the size of the boxes containing each stroke of the character is measured. If all boxes have both x and y dimensions smaller than the punctuation threshold (Pth) the program switches to the 'punctuation mode'. Otherwise it returns to the 'character mode' described above.

The number of isolated parts of the character is evaluated. This function is implemented by counting the number of boxes containing the geometrically separated character strokes. All boxes overlapping each other are merged into one single box.

The purpose of this approach is distinguishing between a symbol made up of two overlapped points (2 strokes, but 1 box) that is still a full stop and another made up of two separated points (2 strokes, 2 boxes), that is a colon. Once the number of separated part of the character has been calculated, three different cases may occur:

a) If there are more than two boxes occupied the program exits 'punctuation mode' and returns to 'character mode' (no punctuation symbol among;,:. is made up of three separated parts).

b) If only one box is occupied the position of the box is evaluated: if it is entirely located under the horizontal line in the middle of the central frame, the program goes to comma/point routine. Otherwise it exits the 'punctuation mode' because the symbol is probably a lowercase letter of small size. The comma/point routine checks whether the punctuation symbol is a comma or a full stop. It uses two different pieces of information: box size and position. It calculates the following score:

$$Score = PW*(af[1] - fAC - FPB) + DeltaXch + DeltaYch - 2*CTH$$

where

PW is a parameter called punctuation weight, typically this is set to PW=100 af[1] is the position of the lower edge of the box fAC is the position of the separation line between central and bottom frames FPB is the frame punctuation band, that is a threshold value DeltaXch box X-size DeltaYch box Y-size CTH is the comma/point threshold If score >0 the character is recognized as comma, otherwise it is recognized as full stop.

c) If them are two separate boxes occupied the programs exits 'punctuation mode' and returns to character mode in the following two cases:
the upper box overlaps the top frame
either X or Y size of the upper box exceeds CTH Otherwise, the comma/point routine described above is applied to the lower box. If score >0 the character is recognized as semicolon, otherwise it is recognized as colon.

One possible method of implementing the invention may be illustrated by referring to the Program Listing on pages 26 to 78.

This HPCR (hand printed character recognition) project is capable of being implemented on hardware. To ease the migration to silicon, when necessary, the number of black pixels has been chosen constant and equal to 16. However this is merely a prefered choice and is not intended to be limiting.

Migrating the above described system on silicon would provide several advantages, the most relevant being:

An increase in Speed which would mean that dedicated hardware could exploit massive parallel architecture to perform the numerous comparison operations needed to implement both the feature extraction and the associative memory in a much shorter time.

The power consumption would be minimized and the dedicated hardware might be activated only when recognition has to be performed. Database memory could be integrated on chip. Thus saving the power needed to drive the external buses.

Dedicated chips may be employed in low-cost consumer products where powerful, state-of-the-art Micro chips are not available.

It has to be mentioned that the system lends itself very well to silicon implementation. In fact, the operations to be performed, though numerous, are very simple in themselves (basically AND and EXNOR). The massively parallel architecture needed for high speed might be built around DRAM memory cores (used for database/feature storage) in a relatively simple way thanks to the internal structure of DRAM themselves.

As previously mentioned there are a number of ways in which the system can be implemented on hardware. Four main embodiments are described below. The first two concern a circuit for extracting geometrical or topographical features from the digital patterns representing the characters, whilst the second two embodiments concern classification of the digital patterns as a result of comparison thereof with the standard or reference patterns.

Figures 10, 11:
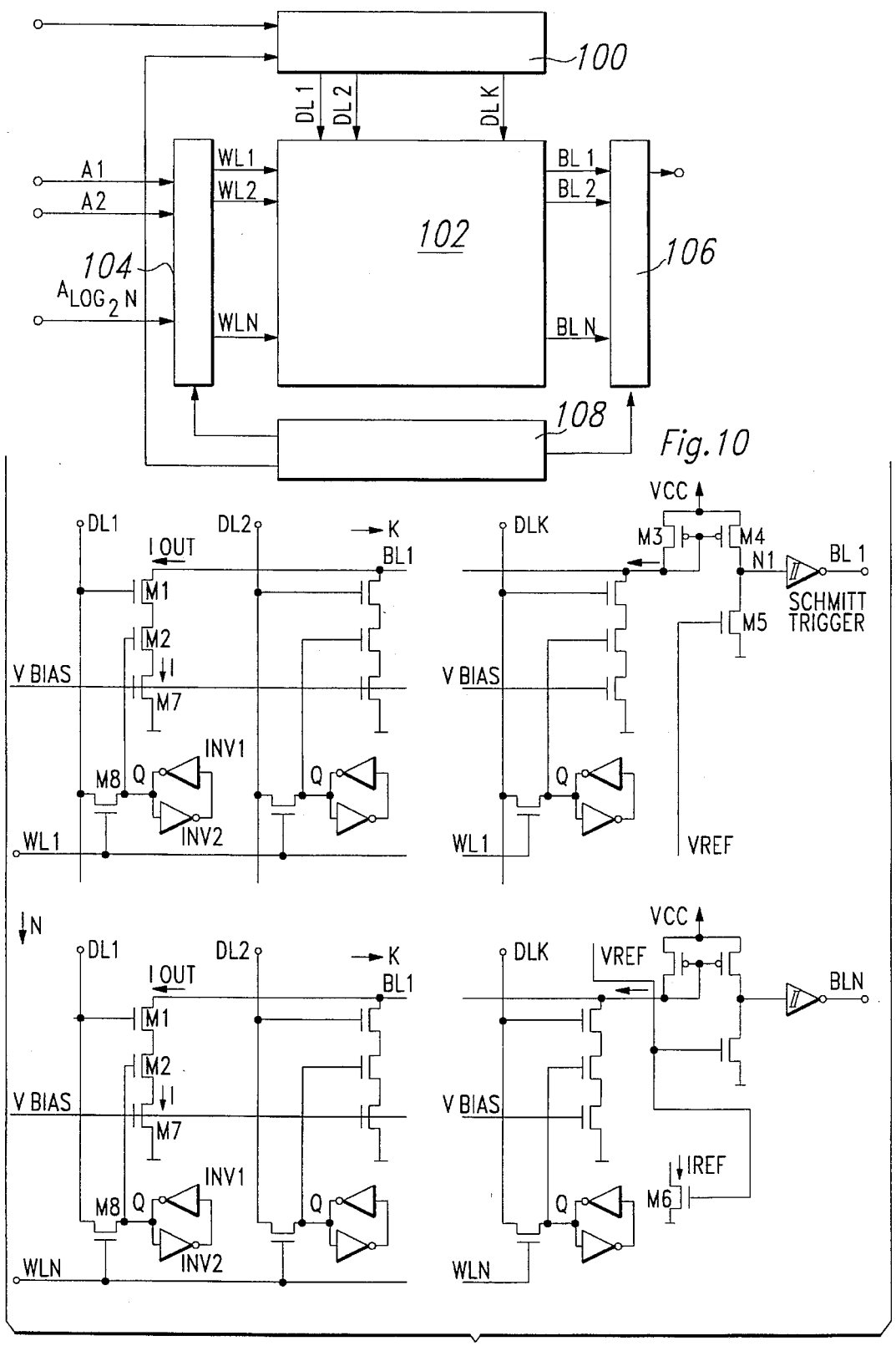
FIG. 10 is a block diagram of a circuit or for storing geometrical patterns and for comparing to the pattern to be classified thereto.
FIG. 11 is a circuit diagram for an array of storage and comparison cells for use in the FIG. 10 circuit.

By referring to FIG. 10, it can be noted that the circuitry according to the first such embodiment comprises an input service or buffer memory 100 effectively arranged as a K-bit serial register having a serial input port and a parallel output port of K-bits, DL1, DL2, . . . , DLK, to which both the N elementary geometrical patterns, and the pattern to be classified are supplied.

The K outputs of the input buffer are coupled to the column inputs of an array of storage and comparison cells, arranged as N rows by K columns in, for example, a RAM 102.

Each storage and comparison cell is adapted to store a digital data item, to compare an input data item to the data item stored therein and to generate a current if both data items are 1.

The row addressing of said array of N rows and K columns of storage and comparison cells is carried out by means of a decode circuitry 104 of conventional construction and operation. It receives an address consisting of a digital log N-bit word and is connected to the array of storage and comparison cells by means of N lines (Word Lines) WL1, WL2, . . . , WLN.

The array of storage and comparison cells have an output line for each row and have, therefore, N output lines (Bit Lines) BL1, BL2, . . . , BLN, by which it is connected to an output service or buffer memory 106 having N parallel inputs and a serial output, wherefrom the transcoded pattern is obtained.

Lastly, a control logic 108 is provided for driving the decoder as well as both the input and the output buffers.

Before examining the circuital implementation of the block including the storage and comparison array, the operation mode will be explained in its whole.

It is assumed that an unknown character or a standard character is to be transcoded in geometrical terms as a function of N elementary patterns representing as many elementary geometrical features. When each matrix is "unrolled" it can be seen that each character or geometrical feature is represented by a pattern consisting of a K-bit string.

A preliminary step to be carried out for transcoding provides for loading all of the concerned elementary geometrical patterns into the storage and comparison cell array.

In this respect, each K-bit elementary geometrical pattern is serially loaded into the K locations of the register comprising the input buffer. This transfer is driven by the control logic.

When all of the elementary geometrical patterns have been loaded into the array, the circuit is ready to transcode a standard or unknown pattern as a function thereof.

The pattern to be transcoded is therefore serially loaded into the register and then identically and simultaneously transferred to all rows of said storage and comparison cell array. These cells, which already contain a bit of the elementary geometrical patterns, are adapted to compare the two bits and to generate a current if and only if both bits have a logic 1 value. In other words, for each row, the pattern to be transcoded is compared to an elementary geometrical pattern and a current is generated for each pair of homologous 1 values.

Since all of the cells of a row are connected to a single output line (Bit Line) BL1, BL2, ..., BLN and since the currents are therefore additive, the Bit Line of each row will be run by a current proportional to the number of coincident 1 values that can be found between the bits of the pattern to be transcoded and the homologous bits of the elementary geometrical pattern stored therein. All of the N output lines BL1, BL2, ... BLN are connected through a threshold discrimator circuit (not shown in FIG. 10) and a Schmitt trigger circuit (not shown in FIG. 10) so as to output a "0" signal when the line current is less than and a "1" signal when it is greater than a predetermined threshold value. All outputs are parallel loaded into an output buffer memory which serially furnishes a N-bit digital pattern representing the transcodification in geometrical terms.

As above mentioned, the input and output service or buffer memories, the decoder used for row addressing the storage and comparison cell array, as well as the control logic that drives and synchronizes the operation of the whole circuit are conventionally operating components, so that only the circuitry of said array will now be explained in greater detail.

The above quoted array of storage and comparison cells is partially shown in FIG. 11. It comprises N×K cells, arranged as N rows and K columns.

All of the cells of a column simultaneously receive the bits of the patterns to be stored or to be compared through the data lines DL1, DL2 ..., DLK from the corresponding locations of the input register, and all of the cells of a row simultaneously receive the address information from the address decoder block through the address lines (Word Lines) WL1, WL2 ..., WLN and their outputs are connected to the output buffer through the output lines (Bit Lines) BL1, BL2, ..., BLN, respectively. Furthermore, a common bias voltage Vbias, the function of which will be apparent hereinafter, is coupled to all of the cells of the array.

Each cell can be considered as consisting of two sections for respectively carrying out the function to store a bit of an elementary geometrical pattern and the function to compare the bit stored therein to the homologous bit of the pattern to be transcoded in geometrical terms as well as to generate a current only when the values of both compared bits are 1.

The storage section includes a MOS transistor M8, this can be considered as an enabling or addressing transistor having its gate region connected to the address line, for instance to line WL1 for the cells of the first row, said transistor being inserted between the data line (or column line), f.i. DL1, for the cells of the first column, and a node Q to which two invertors INV1 and INV2 are connected, back-to-back coupled, in order to form a memory cell.

From an operation stand point, it can be easily observed that, when a bit is to be stored in said memory cell INVI-INV2, for instance a bit "1", this is made possible through data line DL1, provided that the concerned cell is addressed through address line WL1 thereby turning transistor M8 on. Transistor M8, therefore, acts as a switch. The stored data remain available on node Q.

In conclusion, if a given elementary geometrical pattern is to be stored in row i, of said array, as it has already been noted, it is at first serially stored into the input shift register and subsequently it is parallel transferred into the cells of row i of the array by simply addressing the cells of such row through line WLi, whilst the cells of all remaining rows are disabled.

As far as the comparison section is concerned, each cell includes a MOS transistor M7 acting as a current generator, connected to ground and having its gate region driven by voltage Vbias.

Two more MOS transistors M1, M2, having their gate regions connected to data line DL1 and to the node Q, respectively are cascade connected to transistor M7.

From an operation view point, it can be observed that, for a comparison to be made between the data item stored in memory cell INVI-INV2 and available on node Q and the data item available on data line DL1, it will be sufficient to turn transistor M7 on by means of the bias voltage Vbias. It can be seen that only when the data items available on node Q and on data line DL1 are both "1", will transistors M1 and M2 both be on and transistor M7 will be able to supply an output current I out through output line BL1. There is no other possibility for a current Iout to be supplied.

Since each cell row contains an elementary geometrical pattern and for each cell row a comparison is carried out between a pattern to be transcoded and the elementary geometrical pattern stored therein and since all of the cells of a row i are connected to the same output line BLi, the output current supplied by said line BLi will be the sum of the currents supplied to said line by all cells where both the stored data item and the data item compared thereto will have logic "1" value.

Of course, during the loading step of the elementary geometrical patterns, it will be convenient to reset voltage Vbias to zero, thereby turning off current generator transistor M7. This avoids unnecessary current absorption.

Each output line BLi is terminated by two P-MOS type transistors M3, M4, connected as a current mirror arrangement, so as to supply to output node N1 a current proportional to current Iout. In addition, a Schmitt trigger circuit 120 is connected to node N1. Two more MOS transistor MS, M6 are also connected to said node N1 (transistor M6 being common to all of the rows) and are arranged as a current mirror so that a predetermined reference current Iref is furnished by said output node NI, thereby establishing a threshold value. If current Iout is greater than this threshold value, then node NI will be in a logic high state and the Schmitt trigger circuit will be switched.

If current Iout is smaller than this threshold value, then node N 1 will be in a logic low state and the Schmitt trigger circuits, will therefore be "1" in respect of all rows when the number of cells where both the stored data item and the compared data item are "1" is greater than an experimentally predetermined minimum number.

The outputs of the Schmitt trigger circuits are connected to the parallel inputs of the output service or buffer memory, whose serial-type output represents the transcodification in geometrial terms of the input pattern as a function of the elementary geometrical patterns stored in said array of storage and comparison cells.

Figure 12:
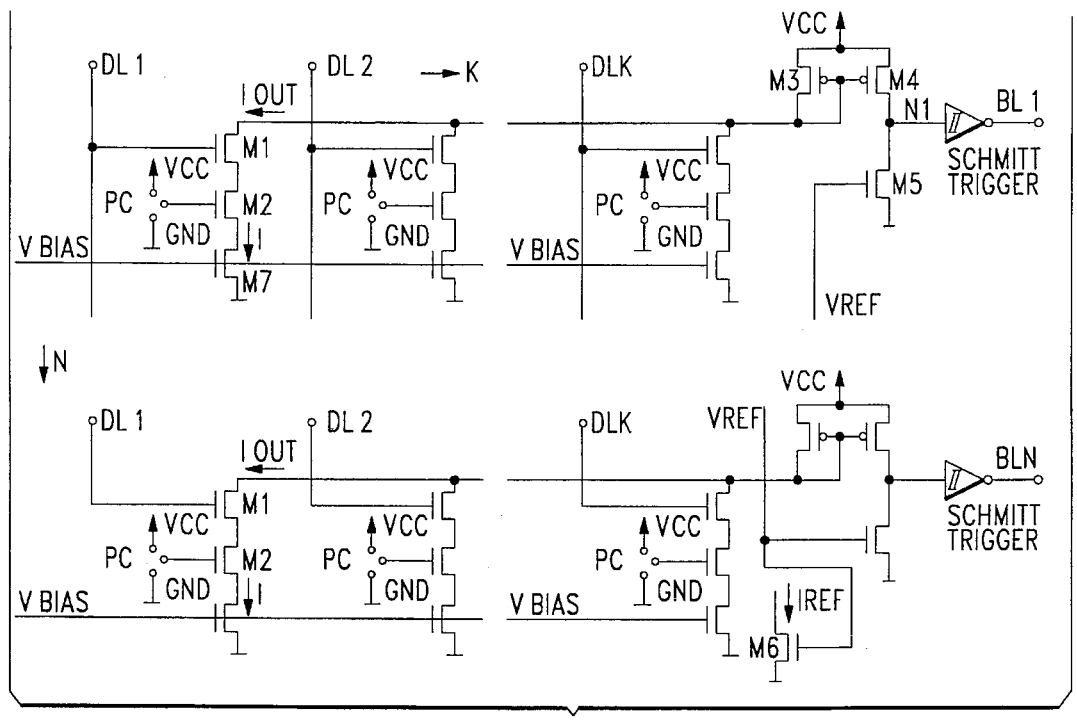
FIG. 12 is a different embodiment of the array for use with the FIG. 10 circuit.

Referring now to FIG. 12, a different possible implementation of the storage and comparison cell array is shown. This second embodiment is designed for an application where there is no need to change the preliminary stored contents of said cells and it is implemented by means of ROM memory cells. The main advantage of this approach is to be found in the smaller area of a silicon wafer needed to implement a ROM cell rather than a static or dynamic RAM cell. The block diagram of the device is unchanged, except in so far as the address decoder is concerned: in fact in this case it can be omitted.

Loading the elementary geometrical patterns is carried out only once during the whole useful life of the device, by suitably connecting programmable contacts PC of FIG. 4, i.e. a reference set is pre-programmed into the memory and the system is not capable of "learning" new characters.

Gate region of transistor M2 is connected to ground or to supply voltage Vcc depending on whether a logic "1" or a logic "0" is to be loaded into the memory cell.

Such an embodiment operates identically to the first embodiment: in fact, a current will be supplied to line BL1 (by transistor M7) only when the gate region of transistor M2 is connected to voltage Vcc and when the logic value of the data item coupled to gate region of transistor M1 is "1". The logic operation performed is apparently an AND operation, in both embodiments.

Figure 13:
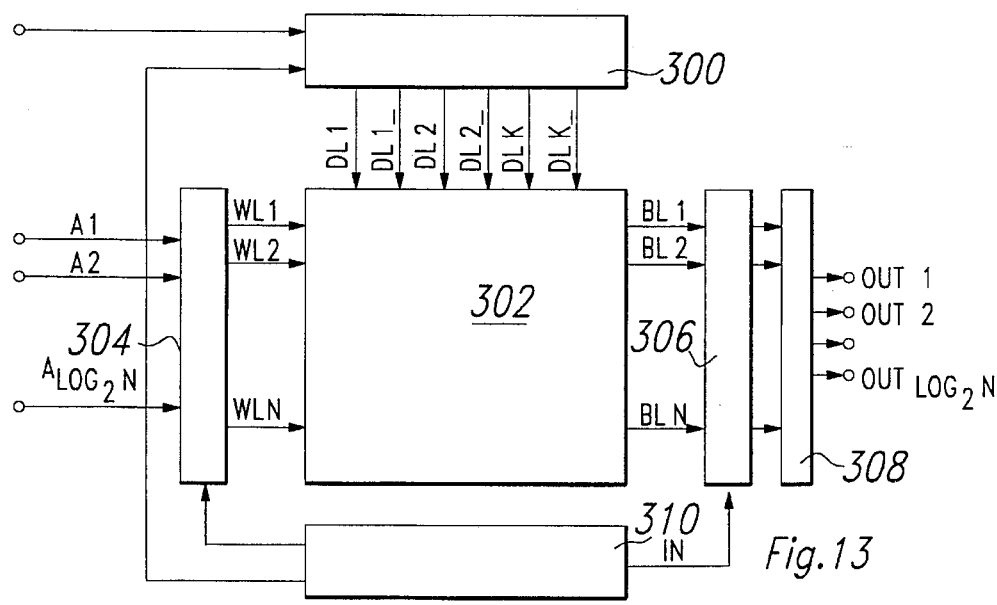
FIG. 13 is a block diagram of a further embodiment of classification circuitry for digital patterns or configurations.

The third embodiment is physically similar to the first embodiment in certain respects and the differences are described in detail below. Referring to FIG. 13, it can be observed that the circuitry comprises an intermediate memory or input buffer 300, that in effect can be implemented as a K-bit serial register having a serial input and a K-bit parallel output. This input buffer is also capable to supplying the above said K parallel outputs not only in their true form but also in their negated or complemented form, namely DL1, $\overline{DL1}$, DL2, $\overline{DL2}$, ..., DLK, $\overline{DLK}$.

The K outputs of the input buffer, together with their complemented forms, are applied to the column inputs of an assembly or array of storage and comparison cells, arranged as N rows and K columns of, for example, a RAM 302. Each column receives both the time and the complemented data items, as will be described in more detail below.

Each storage and comparison cell of the array is adapted to store a digital data item, to compare the input data item to the data item already stored therein and then to generate a current if a coincidence exits between the stored data item and the input data item.

The rows of said N-row by K-column storage and comparison cell array are addressed by means of a suitable decoder circuitry 304 is connected to the storage and comparison cell array by means of N lines (Word Lines) WL1, WL2, ..., WLN.

The storage and comparison cell array in the RAM 302 has an output for each row, namely N output lines (Bit Lines) BL1, BL2, ..., BLN, to which a Logic Block 306 is connected, and which is adapted to Carry out, for example, a FUZZY OR function.

Such a function consists in selecting among N line currents the one having the maximum current. Thus, from a practical stand point and by carrying out an analog-to-digital conversion, such a function consists in receiving N analog current inputs and in generating a digital string of N output bits comprising all but one 0's and one 1 corresponding to the input line run by the maximum current.

Lastly, a coder 308 having N inputs and $\log_2 N$ outputs, codes and classifies said output string output from the logic block.

Considering again the application example of the character acknowledgement or recognition, it is assumed that an unknown character is to be acknowledged or recognised and classified by means of a comparison thereof to a set of example or standard samples of the same character, each of which is expressed as a matrix of X rows by Y columns, for a total of K bits. When each matrix is "unrolled", it can be realised that each character is expressed by a configuration or pattern consisting of a string of K bits.

The preliminary step for this comparison to be effected is loading all of the sample patterns, whether standard or user dependant, into the storage and comparison cell array. Aiming at this result, each K-bit sample pattern is serially loaded into the K locations of the register acting as an input buffer. Logic circuitry 310 controls this loading step. When this loading step for loading the sample pattern into the register is completed, the control logic circuitry effects a parallel loading step by means of which the whole K-bit string is transferred from the register into a storage and comparison cell row of the array, a bit for each cell. The row addressing function is effected by means of the decoder block again under control of the control logic circuitry.

When all of the sample patterns have been loaded into the array, the circuit is ready to classify a new unknown pattern to be acknowledged or recognised. This unknown pattern is therefore serially loaded into the register and then identically and simultaneously transferred together with its negated or complemented form into all of the rows of the storage and comparison cell array. These cells, each of which already contains a bit of the sample patterns, are adapted to compare the bit pertaining to them under column order namely bit 1 for column 1 and so on—to the bit stored therein and to generate a current when and only when the two bits coincide. Should no coincidence exists, no current is generated.

In other words, for each row, the unknown pattern is compared to a sample pattern and a current is generated for each coincidence of homologous bits. Since all of the cells of a row are connected to a single output line (Bit-Line) BL1, BL2, ..., BLN, and since the currents generated in the individual cells are additive, the Bit Line of each row will be run by a current that is proportional to the number of coincidences that are realized in the row between the bits of the unknown pattern to be classified and the homologous bits of the sample pattern stored therein.

Since the comparison is carried out in parallel mode for each individual row and contemporaneously in all rows, the N output lines (Bit Lines) will be run by different currents, the intensities of which are true representations of the number of coincidences between the bits of the unknown pattern and the bits of the respective sample patterns. Therefore, they are an indication of the similiarity ratio between the unknown pattern and the sample pattern stored in each individual row.

The N lines BL1, BL2 ..., BLN are connected to the FUZZY or logic block which receives, therefore, N input analog signals and supplies a digital output signal consisting of a N-bit string, the bits of which are all 0's except a bit 1 corresponding to the Bit Line having the maximum current.

The conclusive step of the method is coding the N-bit digital output from the logic block into a code of $\log_2 N$ bits which then identifies and classifies the unknown pattern in the light of the known standard sample patterns.

Figure 14:
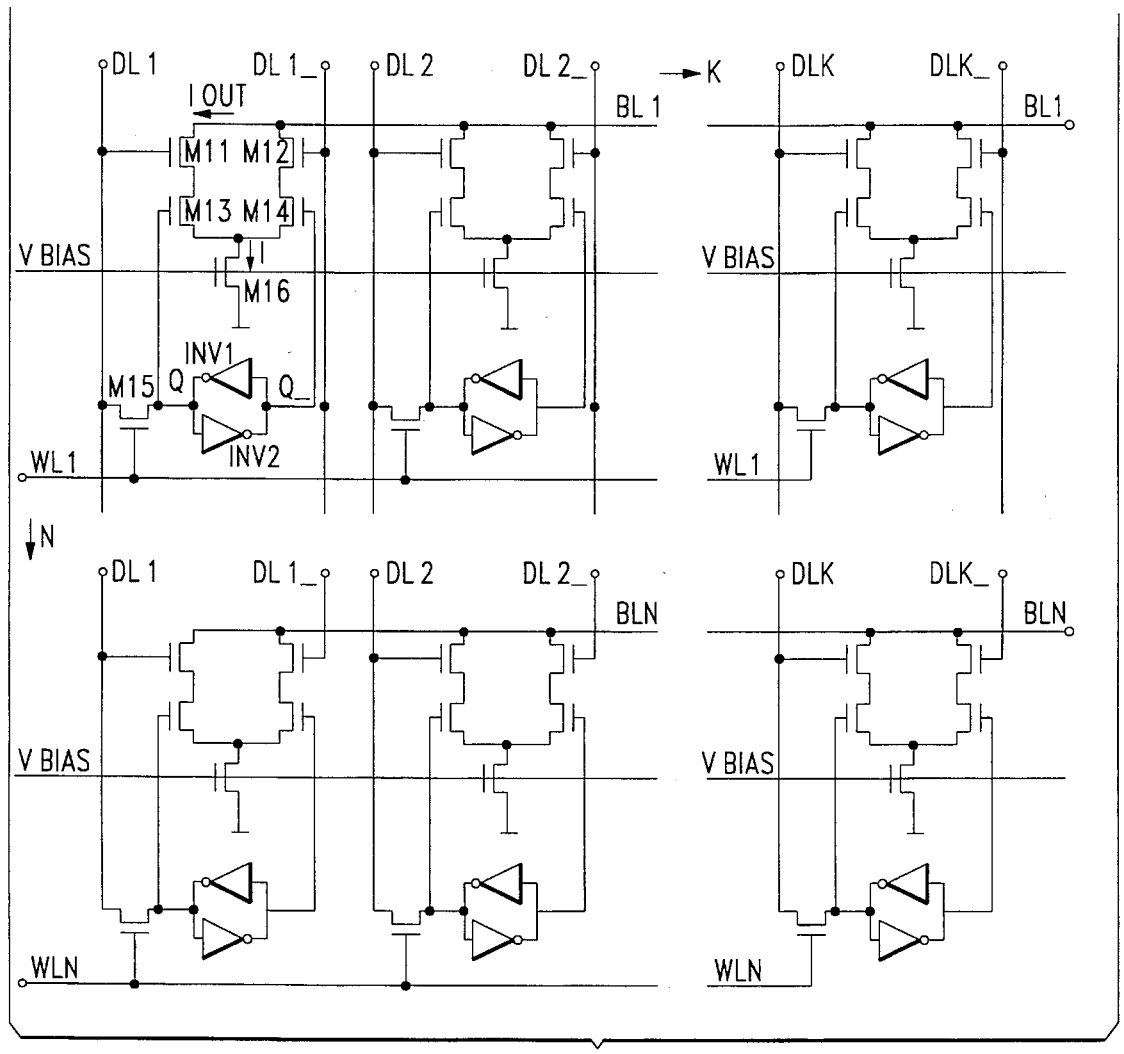
FIG. 14 is a circuit diagram of the storage and comparison cell array for use in the FIG. 13 circuit.

The storage and comparison cell array is partially shown in FIG. 14. It comprises N×K cells arranged as N rows by K columns. All of the cells of a column contemporaneously receive both the true dam, through data lines DL1, DL2, ..., DLK, and the negated data through data lines $\overline{DL1}$, $\overline{DL2}$, ..., $\overline{DLK}$ from the corresponding location of the shift register operating as input buffer. All of the cells of a row contemporaneously receive the address signals through address lines Wl1, WL2, ..., WLN from the address decoder and are connected through output lines or so-called Bit Lines BL1, BL2, BLN, respectively, to corresponding input port of the FUZZY OR logic block. Furthermore, all of the cells of the array receive a common bias voltage Vbias, the function of which will subsequently be described.

Each cell can be considered as consisting of two sections, namely a storage section adapted to store a bit of a sample pattern and a comparison section adapted to compare thereto an homologous bit of the pattern to be classified and to generate a current if the two compared bits coincide.

The storage section of each cell comprises a MOS transistor M15, that can be considered as an enable or address transistor having its gate region connected to the address line, for instance to address line WL1 for the cells of the first row, and inserted between the true data line, for instance DL1, for the cells of the first column, and node Q. Two back-to-back parallel connected inverters INV1 and INV2 are linked to node Q so as to build up a memory or storage cell. Node $\overline{Q}$, that is the other interconnection node of said two inverters, corresponds to node Q.

From an operational view point, it can be easily observed that, when a bit is to be stored in memory cell INVI-INV2, this is made possible through data line DL1 on condition that the cell is addressed through enable line WL1 that turns transistor M15 on. Transistor M15, therefore, operates as a switch. The data item to be stored is available, therefore, on node Q.

In conclusion, when a sample pattern is to be stored in row i of the array, then, as it has been seen, it is first stored in the serial register and subsequently transferred to the cells of row i of the array by simply addressing such row of the array through line WLi, while all remaining rows are disabled or deselected.

As far as the comparison section is concerned, each cell comprises, for example, a MOS transistor M16 operating as a current generator connected to ground and biased by voltage Vbias on it gate region. Two parallel branches depart from the drain region of transistor M16 each of which comprises two serially connected, MOS transistors M11, M13, and M12, M14, respectively, so arranged that the first two corresponding transistors M11 and M12 have their gate regions connected to the true data and negated data lines, respectively, namely DL1 and $\overline{DL1}$, for instance; the second two corresponding transistors M13 and M14 have their gate regions connected to the two nodes Q and $\overline{Q}$ of the storage or memory cell INVI-INV2. The two transistors M11, M12 are both connected to the row output line, for instance BL1.

From an operational view point, it can be observed that, for a comparison to be carried out between a data item stored in memory cell INV1-INV2 (which is determined by the high/low logic state of the two nodes Q and $\overline{Q}$) and a data item to be compared (which data item is furnished together with its corresponding negated or complemented data item through the two lines DL1 and $\overline{DL1}$) it will be sufficient to turn on transistor M16 by means of the bias voltage Vbias. Assuming that, for instance, node Q is 1 and node $\overline{Q}$ is therefore 0, when the data item to be compared is 1, then both transistor M11 and transistor M13 are turned on, while both transistors M12 and M14 are turned off. In this condition, current Iout flowing in output line BL1 is the same current generated in transistor M16. Should the data item to be compared be 0, then transistor M11 would be turned off and, since also transistor M14 is also turned off, generator transistor M16 is insulated and does not contribute to the current of the output line BL1.

Since the cells of each row contain a sample pattern and a comparison between the pattern to be classified and the sample pattern stored therein is carried out in each row and since all of the cells of a row are connected to the same output line BL, at the output of line BL a current will be obtained that is the sum of all currents supplied to the concerned line by all cells where a coincidence occurred between the stored bit and the compared bit.

The truth table below will explain the possible combinations:

| DL1 | $\overline{DL1}$ | Q | $\overline{Q}$ | M11 | M12 | M13 | M14 | Iout |
|---|---|---|---|---|---|---|---|---|
| 0 | 1 | 0 | 1 | OFF | ON | OFF | ON | I |
| 0 | 1 | 1 | 0 | OFF | ON | ON | OFF | 0 |
| 1 | 0 | 0 | 1 | ON | OFF | OFF | ON | 0 |
| 1 | 0 | 1 | 0 | ON | OFF | ON | OFF | I |

Of course, during the sample pattern loading step, it will be convenient to make Vbias=0, thereby turning generator transistor M16 off, in order to prevent unnecessary current absorption.

Since the comparison between the pattern to be classified and all sample patterns stored in the array is carried out in parallel and contemporaneously for all of them, the comprehensive output will comprise N output lines BL1, BL2 ..., BLN each bearing a current which is proportional to the number of cells of each respective row wherein a coincidence has been established between the data item stored therein and the data item related to the homologous bit of the pattern compared for classification.

As a result thereof, the line BLi (where i=1, 2N) having the maximum current will be the one associated to the row containing a sample pattern with respect to which the unknown pattern to be classified will have maximum "similarity" grade.

By referring now to FIG. 15, the circuitry by which the logic block function is implemented will now be discussed. Assuming N input lines BL1, BL2 ..., BLN bearing different currents and, therefore, assuming N analog input signals, such function is exploited by furnishing a digital output consisting of a N-bit string comprising all 0's except the bit corresponding to the maximum current input that is 1.

Figure 15:
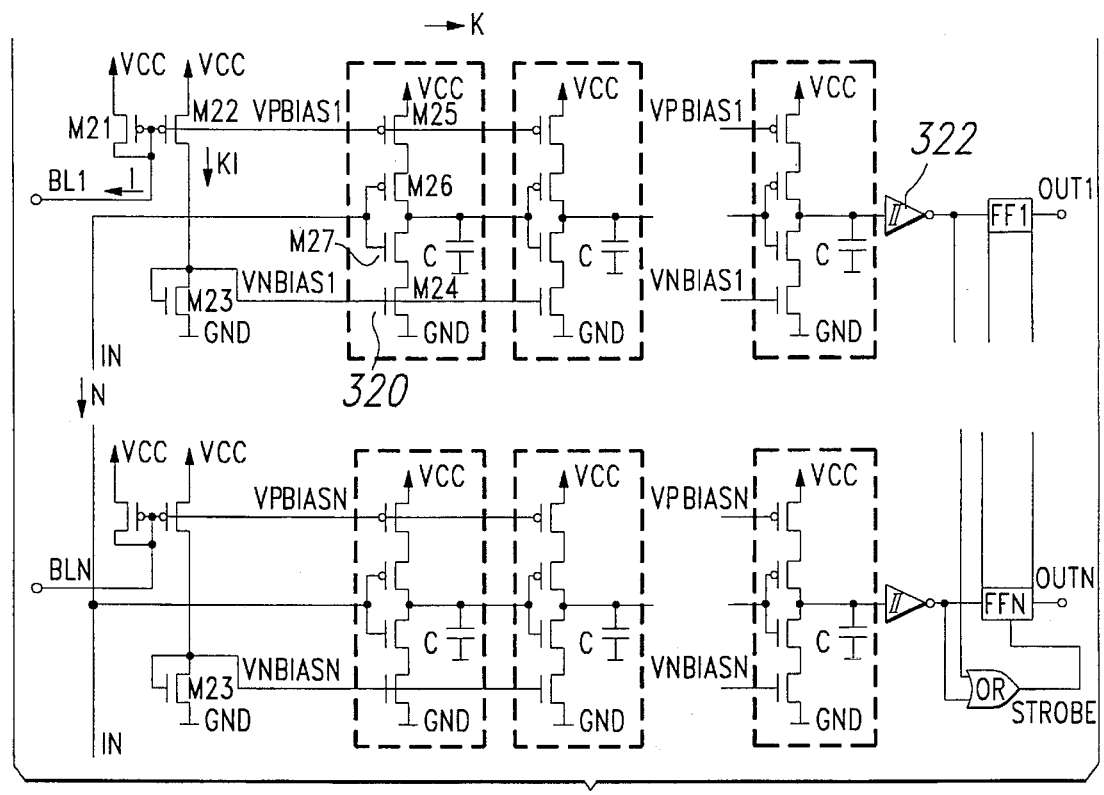
FIG. 15 is a circuit diagram of a logic block for use in the FIG. 13 circuit.

The circuit shown in FIG. 15 includes N identical networks, individually related to each Bit Line BLi. Each of said networks comprises, by referring to the first line BL1, a first and a second MOS transistors M21 and M22, interconnected as a current mirror circuit. First transistor M21 is run by the line current I and consequently, the second transistor M22 is run by a current proportional to the line current by a factor K. A third transistor M23 also run by the current flowing through the second transistor M22 is inserted downstream to transistor M22. A chain of delay cells forming as a whole a delay line are connected downstream to the transistor pair M22, M23. Each delay cell comprises a first and a second MOS transistor, namely M24 of N type and M25 of P type, connected between ground and supply voltage Vcc. Between transistors M24 and M25 an inverter circuit 320 is inserted comprising two cascade connected MOS transistors, M26 and M27, with P channel and with N channel, respectively, having their gate regions interconnected together and driven by voltage IN. The interconnecting source-drain node P of the transistors M26, M27 is connected to ground through capacitor C and is connected to the interconnection node of homologous transistors M26, M27 of all subsequent cells of said cell chain.

In the same manner, the gate regions of the P-MOS transistors forming the first current mirror M21, M22 are connected to the gate regions of the P-MOS transistors forming the first current mirror M21, M22 are connected to the gate regions of all homologous P-MOS transistors M25 of all cells in order to furnish voltage VPbias and also gate-drain node of N-MOS transistor M23 is connected to the gate regions of homologous transistors M24 of all delay cells (in order to furnish voltage VNbias).

As far as the operation is concerned, it should be noted that, in view of their arrangement as a current mirror, transistors M24 and M25 are run by the same current as transistors M22 and M23 and this current is proportional to the current flowing in transistor M21. This current is in turn proportional to the number of cells of the related line BLj where a coincidence exists between the stored data item and compared data item. Therefore, since the control signal IN is common to all of the delay cell chains, when signal IN=0, then transistor M26 is on and transistor M27 is off, and consequently capacitor C is charged to logic 1 level. When currents flowing through bit lines BLj have settled, signal IN is raised to logic 1 level and consequently transistor M26 is turned off and transistor M27 is turned on. In this manner, capacitor C is discharged through transistors M27 and M24. Since transistor M24 supplies a current proportional to the current relating to bit line BLj, it will be understood that capacitor C will be discharged at a rate proportional to the bit line current. In other words, the status of node P will change over at a rate that is proportional to the magnitude of the current of the related bit line.

Since there are a number of cells M25, M26, M27, M24 a resulting delay line is implemented such that, at any change over of a cell a change over in opposite direction occurs in the subsequent cell and the transition of signal IN will propagate along the delay line with a delay that is inversely proportional to the current of the related bit line.

Each delay line is terminated by a Schmitt trigger circuit 322. The first of the Schmitt trigger circuits to change over will be the one associated to the delay line where the minimum transition delay is developed or, in other words, the one associated to the bit line run by the maximum current.

Flip-flop circuits FF1, FF2, ..., FFN are connected to the outputs of the Schmitt trigger circuits and the outputs of the Schmitt trigger circuits are combined in a N-input or gate logic block 324, the output of which acts as a strobe signal to disable the flip-flop circuits FF1, FF2, ..., FFN. Therefore, the change or switch over of one of the Schmitt trigger circuits entails the change or switch over of the corresponding flip-flop circuit and immediately thereafter the remainder of the flip-flop circuits are maintained in the state they were in at that moment. This means that assuming that all flip-flop circuits FF1, FF2, ... FFN are initially in a certain state, for instance state 0, after the above mentioned changing over and maintenance step, they will be still in the same state, except for the one that will have changed over to state 1. This one is corresponding to the bit line having the maximum current or the maximum number of coincidence between the stored data and the compared data in other words. Outputs OUT1, OUT2, ..., OUTN, will form a string comprising all but one 0's and one 1 which, as above, will be applied to the codified block, whose output code will identify the pattern having the maximum similarity level with respect to the pattern to be classified.

Figure 16:
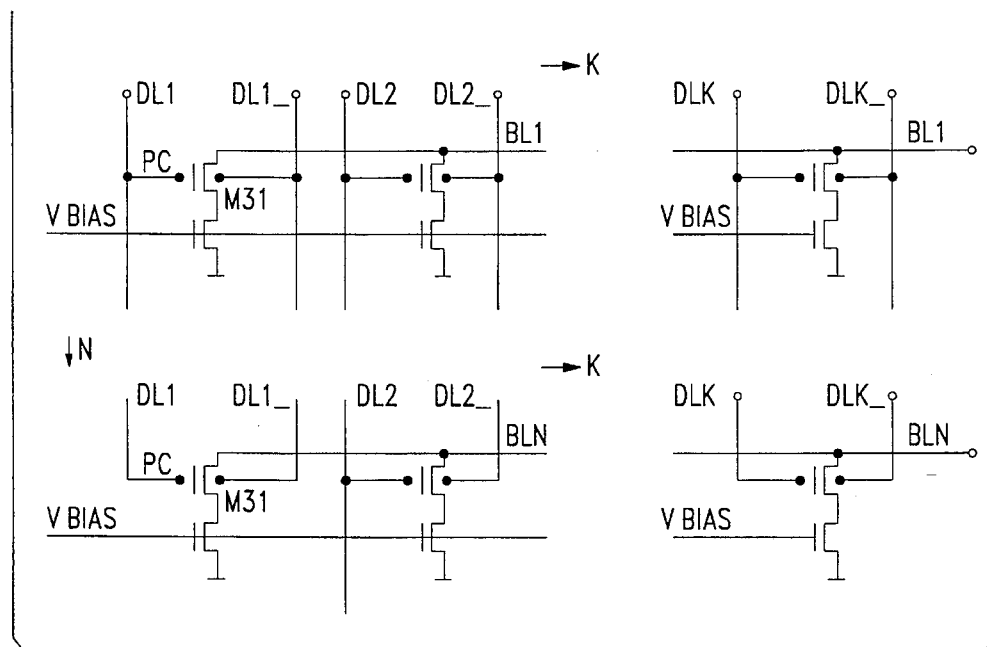
FIG. 16 is a circuit diagram of an alternative storage and comparison cell array for use in the FIG. 13 circuit.

By referring to FIG. 16, a different circuit implementation of the storage and comparison cell array is shown. This fourth embodiment which is similar the second embodiment, is implemented by means of ROM memory cells rather than RAM memory cells and it is designed for an application in which there is no need to change the contents of the cell array. The main advantage of this solution is the smaller silicon area needed to embody a ROM memory cell with respect to a static RAM memory cell. The block diagram of the device is unaltered bearing in mind, however, that the address decoder in this case can be omitted.

Loading the sample patterns into the array is carried out only once in the useful life of the device by suitably connecting the programmable contacts shown in FIG. 16. In particular, the concerned memory cells are loaded with 1 or with 0 according to whether the gate regions of the related transistors are connected to the true data lines or to the negated data lines. More particularly, if the gate region of transistor M31 is connected to line DL1, the data item virtually stored in the cell is a logic 1 state, and, if said gate region is connected to line $\overline{DL1}$, a logic 0 state is virtually stored in said cell. Such a circuit implementation, in effect, exploits an exclusive or function. In fact, in the former case, the cell supplies a current only if DL1=1 and $\overline{DL1}$=0 and, in the second case, it will supply a current only if DL1=0 and $\overline{DL1}$=1.

* OPTIONS.H * pragma option -1 -A- -a- -b- -C -d- -ff -G -h- -K -mc -N- -O2 -p- -r

\*\*\* TYPEDEF.H \*\*\*

```c
#define CHAR_0 '.'
define CHAR_1 '#' ifdef __TINY__
error Memory model not supported
#endif
#ifdef __SMALL__
#define memalloc(size) malloc(size)
#define memfree(pointer) free(pointer)
#endif
#ifdef __MEDIUM__
#define memalloc(size) farmalloc(size)
#define memfree(pointer) farfree(pointer)
endif
#ifdef __COMPACT__
#define memalloc(size) malloc(size)
#define memfree(pointer) free(pointer)
#endif
#ifdef __LARGE__
#define memalloc(size) farmalloc(size)
#define memfree(pointer) farfree(pointer)
endif
#ifdef __HUGE__
#define memalloc(size) farmalloc(size)
#define memfree(pointer) farfree(pointer)
endif define min(a,b) (((a) < (b)) ? (a) : (b))
define max(a,b) (((a) > (b)) ? (a) : (b))

#define pt_in_box(p,b) ((p.x >= b.min.x) && (p.x <= b.max.x) && \
                        (p.y >= b.min.y) && (p.y <= b.max.y))

#define ROWS 16              /* Numero di righe */
define COLS (8 * sizeof (row))  /* Numero di colonne */ define N_DEF_X 9            /* Lunghezza del vettore xd */
define N_DEF_Y 17           /* Lunghezza del vettore yd */ define MAX_BUTTONS 6        /* Massimo numero di pulsanti */ define MAX_POINTS 10000     /* Massimo numero di punti */
define MAX_STROKES 200      /* Massimo numero di strokes */ typedef unsigned char
    byte;                /* Byte (8 bits) */ typedef unsigned int
    word;                /* Word (16 bits) */ typedef unsigned long
    dword;               /* Double word (32 bits) */ typedef word
    row;                 /* Riga di 16 bits */
```

```
typedef row
    matrix [ROWS];          /* Matrice di 16x16 bits */ typedef enum {
    FALSE,                  /* Booleano FALSE */
    TRUE                    /* Booleano TRUE */
} bool;                     /* Tipo booleano */ typedef enum {
    IGNORE,                 /* Ignora l'errore */
    RETRY,                  /* Riprova l'operazione */
    ABORT                   /* Abortisci il processo */
} errorcode;                /* Codice di ritorno da errore critico */ typedef char
    filename[MAXPATH];      /* Tipo nome di file */ typedef enum {
    ARROW_CURSOR,           /* Cursore freccia */
    HAND_CURSOR,            /* Cursore mano */
    TIME_CURSOR             /* Cursore orologio */
} cursor_type;              /* Tipo del cursore */ typedef enum {
    MENU_ROOT,              /* Menu principale */
    MENU_WRITE,             /* Menu di write */
    MENU_ZOOM,              /* Menu di zoom */
    MENU_OPTIONS            /* Menu delle options */
} menu_type;                /* Elenco diversi menu */ typedef struct {
    int x, y;               /* Coordinate (x, y) di un punto */
} coord;                    /* Definizione di un punto */ typedef struct {
    coord min, max;         /* Punti delimitanti un rettangolo */
} cbox;                     /* Definizione di un'area rettangolare */ typedef struct {
    int first, last;        /* Primo ed ultimo punto dello stroke */
    int char_idx;           /* Carattere di appartenenza */
    cbox box;               /* Box nel quale e' compreso */
} stroke_type;              /* Definizione di uno stroke */ typedef struct {
    char ch;                /* Identificatore del carattere */
    bool frame[8];          /* Flag per ogni possibile frame */
} charframe;                /* Frames possibili per il carattere */ typedef struct {
    unsigned x: 4;          /* 4 bits per le X */
    unsigned y: 4;          /* 4 bits per le Y */
} var_xy;                   /* Definizione intersezioni su X e Y */ typedef struct {
    char id_in;             /* Identificatore dell'utente */
    char id_out;            /* Identificatore del riconoscimento */
    cbox box_in;            /* Rettangolo delimitazione in scrittura */
    cbox box_out;           /* Rettangolo della matrice */
    coord idpos_in;         /* Posizione identificatore utente */
```

```
    coord idpos_out;        /* Posizione identificatore riconosciuto */
    coord idpos1_out;       /* Posizione identificatore sotto matrice*/
    matrix mat;             /* Matrice del carattere */
    int n_stk;              /* Numero di strokes */
    int frame;              /* Frame di appartenenza */
    var_xy var[max(COLS,ROWS)];  /* Variazioni sugli assi X e Y */
} char_struct;              /* Definizione di un carattere */ typedef struct {
    coord c;                /* Posizione della stringa */
    cbox b;                 /* Rettangolo del pulsante */
} but_struct;               /* Definizione di un pulsante di menu */ typedef struct {
    word screenmask[16];    /* Maschera dello schermo */
    word cursormask[16];    /* Maschera del cursore */
    int hotX;               /* Puntatore sull'asse X */
    int hotY;               /* Puntatore sull'asse Y */
} graphic_cursor;           /* Definizione layout cursore grafico */ typedef struct {
    char *s;                /* Stringa associata alla voce del menu */
    void (*func) ();        /* Funzione associata alla voce del menu */
} choice;                   /* Definizione di una scelta di menu */ typedef struct {
    int elem;               /* Numero elementi effettivi del menu */
    char *msg;              /* Stringa messaggio associato al menu */
    choice mc[MAX_BUTTONS]; /* Voci del menu */
} menutype;                 /* Definizione di un menu */ typedef struct {
    char ch;                /* Carattere */
    char dc;                /* Dummy character per l'allineamento */
    byte *ftr;              /* Codici delle features */
    int n_stk;              /* Numero di strokes */
    int frame;              /* Frame */
    var_xy var[max(COLS,ROWS)];  /* Variazioni sugli assi X e Y */
    bool obs;               /* Flag di codice obsoleto */
} codex;                    /* Struttura del carattere codificato */
```

* GRAPH.H *

```
void beep (word, word);
void set_coord (coord *, int, int);
void set_box (cbox *, int, int, int, int);
void color (int);
void fillstyle (int);
bool mouse_init (void);
void mouse_show (void);
void mouse_hide (void);
void mouse_cursor (cursor_type);
bool pt_in_menu (coord *);
void box (cbox *);
void del_rect (cbox *);
void wrtext (int, int, char *);
void wrchar (int, int, char);
int mouse_read (coord *);
void mouse_set (int, int);
void init_graphics (void);
void close_graphics (void);
void message (char *);
void warning (char *);
void error (char *);
void redraw_logo (void);
```

* PARMS.H * bool read_default (filename);
bool write_default (filename);

* MATRIX.H *

```
void calc_box_stroke (cbox *, int, int);
void make_matrix (bool);
```

\*\*\* TOOL16.H \*\*\*

```
int get_elements (FILE *, int);
void load_char (FILE *, char_struct *);
int purge_code (void);
bool make_code (void);
bool remake_code (char_struct [], int, bool);
bool save_acode (filename);
bool save_code (void);
bool load_code (void);
char test_char (char_struct *);
void make_vars_xy (char_struct *);
```

* ASMESI.C *

```c
#include "options.h"

#include <stdio.h>
#include <stdlib.h>
#include <dos.h>
#include <bios.h>
#include <dir.h>
#include <graphics.h>
#include <string.h>
include <values.h> define N_CHARS 24        /* Chars number on video */ include "typedef.h"
include "tool16.h"
#include "matrix.h"
#include "parms.h"
#include "graph.h"

bool monocrome = FALSE;       /* Flag for monochrome */
filename strokes_fname = "";   /* Strokes file name */ bool learning = FALSE;
filename learnchar_fname = "ASMESI.LRN";
filename config_fname = "ASMESI.CFG";
charframe *learn_chars = NULL;
int cur_learn_idx, n_learn_chars;

int xd[N_DEF_X], yd[N_DEF_Y];   /* Vectors for layout coords */ int max_chars = N_CHARS;        /* Max number of chars */
char_struct cs[N_CHARS];        /* Vettor for chars definition */ int n_strokes = 0;              /* Current strokes number */
stroke_type *strokes = NULL;    /* Strokes vector */ coord *points = NULL;           /* Point vector */ bool button_pressed = FALSE;    /* Flag for menu key-pressed */
int n_buttons;                  /* Current menu keys number */
but_struct buttons[MAX_BUTTONS]; /* Vector for menu key definition */
cbox pen_range;                 /* Range for pen */ extern int frame_in[2];
int frame_pos[4];               /* Level positions for framing */ void menu_write_back (void);    /* Prototypes for menu functions */
void menu_write_clear (void);
void menu_write_string (void);
void menu_write_return (void);
void menu_learning (void);
void menu_recognize (void);
void menu_insert (void);
void menu_zoom (void);
void menu_zoom_previous (void);
```

```c
void menu_zoom_next (void);
void menu_zoom_return (void);
void menu_setup (void);
void menu_setup_filenames (void);
void menu_setup_default (void);
void menu_setup_loadcode (void);
void menu_setup_makecode (void);
void menu_setup_return (void);
void menu_quit (void);

menu_type cur_menu = MENU_ROOT;  /* Current menu */ menutype menu[4] = {           /* Menu definitions */
  { 6, "Make your selection",
    { { "LEARNING",  menu_learning },
      { "WRITE",     menu_recognize },
      { "INSERT",    menu_insert },
      { "ZOOM",      menu_zoom },
      { "SETUP",     menu_setup },
      { "QUIT",      menu_quit }
    }
  },
  { 3, "",
    { { "BACK",    menu_write_back },
      { "CLEAR",   menu_write_clear },
      { "RETURN",  menu_write_return },
    }
  },
  { 3, "",
    { { "PREVIOUS", menu_zoom_previous },
      { "NEXT",     menu_zoom_next },
      { "RETURN",   menu_zoom_return },
    }
  },
  { 5, "Make your selection",
    { { "FILE NAMES", menu_setup_filenames },
      { "DEFAULT",    menu_setup_default },
      { "LOAD CODE",  menu_setup_loadcode },
      { "MAKE CODE",  menu_setup_makecode },
      { "RETURN",     menu_setup_return },
    }
  }
};

void display_char_mat (int nc, cbox *cb)
/* Displays char matrix of char video number nc in rectangle cb */
{
  register int i, j;
  cbox b;
  row w, mask = (row) 1 << (COLS - 1);
  int x1, y1;
  float dx, dy;
  mouse_hide ();
  if (cb == NULL) b = cs[nc].box_out;
  else b = *cb;
  b.min.x ++; b.max.x --;
  b.min.y ++; b.max.y --;
```

```
   dx = (float) (b.max.x - b.min.x) / COLS;
   dy = (float) (b.max.y - b.min.y) / ROWS;
   for (i = 0; i < ROWS; i ++) {
     w = cs[nc].mat[i];
     for (j = 0; j < COLS; w <<= 1, j ++)
       if ((w & mask) != 0) {
            x1 = b.min.x + j * dx + 0.5;
            y1 = b.min.y + i * dy + 0.5;
            bar (x1, y1, x1 + dx, y1 + dy);
       }
   }
   mouse_show ();
} bool zoom_char_mat (int czc)
/* Display zoomed char matrix of char number cur_char (static int) */
/* If czc is 0 then cur_char is set to 0 and entry routines are performed */
/* If czc is -1 then cur_char is decremented */
/* If czc is 2 then exit routines are performed */
{
  static int cur_char = 0;
  static void *image_buffer;
  unsigned image_size;
  static char *msg = "Character zoomed is n. ***";
  static bool zoom_ok = FALSE;
  cbox cb;
  set_box (&cb, xd[7], yd[15], xd[8], yd[16]);
  mouse_hide ();
  switch (czc) {
    case 0:
      cur_char = 0;
      image_size = imagesize (cb.min.x, cb.min.y, cb.max.x, cb.max.y);
      if (image_size == 0xffff) {
           mouse_show ();
           zoom_ok = FALSE;
           return (FALSE);
      }
      image_buffer = (void *) memalloc (image_size);
      if (image_buffer == NULL) {
           mouse_show ();
           zoom_ok = FALSE;
           return (FALSE);
      }
      getimage (cb.min.x, cb.min.y, cb.max.x, cb.max.y, image_buffer);
      zoom_ok = TRUE;
      break;
    case -1:
      if (cur_char > 0) cur_char --;
      break;
    case 1:
      if (cur_char < (N_CHARS - 1)) cur_char ++;
      break;
    default:
      putimage (cb.min.x, cb.min.y, image_buffer, COPY_PUT);
      memfree (image_buffer);
      mouse_show ();
      return (TRUE);
  }
  if (! zoom_ok) return (FALSE);
```

```
    del_rect (&cb);
    color (WHITE);
    display_char_mat (cur_char, &cb);
    box (&cb);
    sprintf (msg + 23, "%d", cur_char + 1);
    message (msg);
    mouse_show ();
    return (TRUE);
} static void init_frame_pos ()
/* Initialize frame_pos vector */
{
    cbox *cb;
    cb = &cs[0].box_in;
    frame_pos[0] = ((float) frame_in[0] / 100) * (cb->max.y - cb->min.y) + cb->min.y;
    frame_pos[1] = ((float) frame_in[1] / 100) * (cb->max.y - cb->min.y) + cb->min.y;
    cb = &cs[N_CHARS / 2].box_in;
    frame_pos[2] = ((float) frame_in[0] / 100) * (cb->max.y - cb->min.y) + cb->min.y;
    frame_pos[3] = ((float) frame_in[1] / 100) * (cb->max.y - cb->min.y) + cb->min.y;
} void init_layout ()
/* Initialize layout vars */
{
    static long xl[N_DEF_X] = { 500, 1750, 2250, 2750, 5500, 7250,
                                1100, 4350, 6850 };
    static long yl[N_DEF_Y] = { 500, 1125, 1125, 1750, 2075, 2525,
                                3025, 3400, 3900, 4375, 4850, 5500,
                                3250, 5500,  750, 1250, 3875 };
    static long xl_max = 8000, yl_max = 6000;
    register int i, j;
    int dx, ddx, x1, dy, y1;
    for (i = 0; i < N_DEF_X; i ++) xd[i] = xl[i] * getmaxx () / xl_max;
    for (i = 0; i < N_DEF_Y; i ++) yd[i] = yl[i] * getmaxy () / yl_max;
    dx = (xd[5] - xd[2]) / (N_CHARS / 2);
    ddx = (xd[5] - xd[2]) / ((N_CHARS / 2) + 2);
    for (i = 0; i < (N_CHARS / 2); i ++) {
        x1 = xd[2] + i * dx;
        set_box (&cs[i].box_in, x1, yd[0], x1 + dx, yd[1]);
        set_box (&cs[i].box_out, x1, yd[5], x1 + ddx, yd[6]);
    }
    for (i = (N_CHARS / 2); i < N_CHARS; i ++) {
        x1 = xd[2] + (i - (N_CHARS / 2)) * dx;
        set_box (&cs[i].box_in, x1, yd[2], x1 + dx, yd[3]);
        set_box (&cs[i].box_out, x1, yd[7], x1 + ddx, yd[8]);
    }
    dx = (xd[4] - xd[3]) / N_CHARS;
    for (i = 0; i < N_CHARS; i ++) {
        cs[i].id_in = cs[i].id_out = ' ';
        cs[i].n_stk = 0;
        set_coord (&cs[i].idpos_in, xd[3] + (i * dx), yd[4]);
        set_coord (&cs[i].idpos_out, xd[3] + (i * dx), yd[9]);
        set_coord (&cs[i].idpos1_out,
                (cs[i].box_out.min.x + cs[i].box_out.max.x) / 2,
                cs[i].box_out.max.y + 10);
        for (j = 0; j < ROWS; j ++)
            cs[i].mat[j] = 0;
```

```
      }
      dy = (yd[13] - yd[12]) / MAX_BUTTONS;
      for (i = 0; i < MAX_BUTTONS; i ++) {
        y1 = yd[12] + (i * dy);
        set_coord (&buttons[i].c, (xd[1] + xd[0]) / 2, y1 + (dy / 2));
        set_box (&buttons[i].b, xd[0], y1, xd[1], y1 + dy);
      }
      init_frame_pos ();
    } void redraw_box_in ()
    /* Redraw boxes where strokes are written */
    {
      register int i;
      cbox cb;
      set_box (&cb, xd[2], yd[0], xd[5], yd[3]);
      del_rect (&cb);
      color (BLUE);
    /* setlinestyle (DOTTED_LINE, 0, 1);
      for (i = 0; i < N_CHARS; i ++)
        box (&cs[i].box_in);
      color (LIGHTBLUE);   */
      setlinestyle (SOLID_LINE, 0, 1);
      line (cs[0].box_in.min.x, frame_pos[1],
            cs[N_CHARS / 2 - 1].box_in.max.x, frame_pos[1]);
      line (cs[N_CHARS / 2].box_in.min.x, frame_pos[3],
            cs[N_CHARS - 1].box_in.max.x, frame_pos[3]);
      for (i = 0; i < N_CHARS; i ++) {
        line (cs[i].box_in.min.x, frame_pos[(i < N_CHARS / 2) ? 0 : 2],
              cs[i].box_in.min.x, frame_pos[(i < N_CHARS / 2) ? 1 : 3]);
        line (cs[i].box_in.max.x, frame_pos[(i < N_CHARS / 2) ? 0 : 2],
              cs[i].box_in.max.x, frame_pos[(i < N_CHARS / 2) ? 1 : 3]);
      }
    } void redraw_box_out ()
    /* Redraw boxes where matrices are displayed */
    {
      register int i;
      cbox cb;
      set_box (&cb, xd[2], yd[5], xd[5], yd[8]);
      del_rect (&cb);
      color (LIGHTBLUE);
      for (i = 0; i < N_CHARS; i ++)
        box (&cs[i].box_out);
      for (i = 0; i < N_CHARS; i ++)
        display_char_mat (i, NULL);
    } void redraw_id_in ()
    /* Redraw user identifier */
    {
      register int i;
      cbox cb;
      set_box (&cb, xd[3] - 5, yd[4] - 5, xd[4] + 5, yd[4] + 5);
      del_rect (&cb);
      color (CYAN);
```

```c
    for (i = 0; i < N_CHARS; i ++)
        wrchar (cs[i].idpos_in.x, cs[i].idpos_in.y, cs[i].id_in);
} void redraw_id_out (int type)
/* Redraw recognized identifier */
/* If type is 0, 1 or 2 are displayed different informations */
{
    register int i;
    cbox cb;
    for (i = 0; i < N_CHARS; i ++) {
        set_box (&cb, cs[i].idpos_out.x - 5, cs[i].idpos_out.y - 5,
                      cs[i].idpos_out.x + 5, cs[i].idpos_out.y + 5);
        del_rect (&cb);
        set_box (&cb, cs[i].idpos1_out.x - 16, cs[i].idpos1_out.y - 5,
                      cs[i].idpos1_out.x + 16, cs[i].idpos1_out.y + 5);
        del_rect (&cb);
    }
    color (CYAN);
    for (i = 0; i < N_CHARS; i ++) {
        if (cs[i].n_stk == 0) continue;
        switch (type) {
          case 0:
            wrchar (cs[i].idpos_out.x, cs[i].idpos_out.y, cs[i].id_out);
            wrchar (cs[i].idpos1_out.x, cs[i].idpos1_out.y, cs[i].id_out);
            break;
          case 1:
            wrchar (cs[i].idpos1_out.x - 8, cs[i].idpos1_out.y, '0' + cs[i].n_stk);
            wrchar (cs[i].idpos1_out.x + 8, cs[i].idpos1_out.y, '0' + cs[i].frame);
            break;
          case 2:
            wrchar (cs[i].idpos_out.x, cs[i].idpos_out.y, cs[i].id_out);
            wrchar (cs[i].idpos1_out.x - 10, cs[i].idpos1_out.y, '0' + cs[i].n_stk);
            wrchar (cs[i].idpos1_out.x, cs[i].idpos1_out.y, '0' + cs[i].frame);
            wrchar (cs[i].idpos1_out.x + 10, cs[i].idpos1_out.y, cs[i].id_out);
            break;
        }
    }
} void redraw_buttons (menu_type cm)
/* Redraw menu buttons */
{
    register int i;
    cbox cb;
    cur_menu = cm;
    set_box (&cb, xd[0], yd[12], xd[1], yd[13]);
    del_rect (&cb);
    color (LIGHTGREEN);
    for (i = 0; i < menu[cur_menu].elem; i ++)
        box (&buttons[i].b);
    color (GREEN);
    for (i = 0; i < menu[cur_menu].elem; i ++)
        wrtext (buttons[i].c.x, buttons[i].c.y, menu[cur_menu].mc[i].s);
} void redraw_message ()
```

```
/* Clear message */
{
  message (" ");
} void layout ()
/* Redraw whole layout */
{
  redraw_box_in ();
  redraw_box_out ();
  redraw_id_in ();
  redraw_id_out (0);
  redraw_buttons (MENU_ROOT);
  redraw_logo ();
  redraw_message ();
} int get_strokes ()
/* Stores strokes in points and strokes vectors */
{
  register int s_idx, p_idx;
  int status;
  coord c, cp;
  color (RED);
  set_box (&pen_range, xd[2], yd[0], xd[5], yd[3]);
  for (p_idx = 0; p_idx < N_CHARS; p_idx ++) {
    register int i;
    cs[p_idx].n_stk = 0;
  }
  for (s_idx = 0; s_idx < n_strokes; s_idx ++)
    cs[strokes[s_idx].char_idx].n_stk ++;
  for (s_idx = n_strokes,
       p_idx = (s_idx == 0 ? 0 : strokes[s_idx - 1].last + 1);
       (s_idx < MAX_STROKES) && (p_idx < MAX_POINTS);
       s_idx ++) {
    cp.x = cp.y = -1;
    do {
      status = mouse_read (&c);
      if (! pt_in_box (c, pen_range)) status = 0;
      if (button_pressed) {
          set_box (&pen_range, 0, 0, getmaxx (), getmaxy ());
          return (s_idx);
      }
    } while (status == 0);
    strokes[s_idx].first = p_idx;
    moveto (c.x, c.y);
    mouse_hide ();
    while (status != 0) {
      if ((c.x != cp.x) || (c.y != cp.y)) {
          points[p_idx].x = c.x;
          points[p_idx].y = c.y;
          if (p_idx >= MAX_POINTS) break;
          p_idx ++;
          lineto (c.x, c.y);
          cp.x = c.x;
          cp.y = c.y;
      }
      status = mouse_read (&c);
```

```
      if (! pt_in_box (c, pen_range)) status = 0;
    }
    mouse_show ();
    strokes[s_idx].last = p_idx - 1;
    calc_box_stroke (&strokes[s_idx].box,
       strokes[s_idx].first, strokes[s_idx].last);
    {
      int ch_idx, ch_pts[N_CHARS], max_pts = 0, idx;
      for (ch_idx = 0; ch_idx < N_CHARS; ch_idx ++)
          ch_pts[ch_idx] = 0;
      for (p_idx = strokes[s_idx].first;
          p_idx <= strokes[s_idx].last; p_idx ++)
          for (ch_idx = 0; ch_idx < N_CHARS; ch_idx ++)
            if (pt_in_box (points[p_idx], cs[ch_idx].box_in)) {
              ch_pts[ch_idx] ++;
              break;
            }
      for (ch_idx = 0; ch_idx < N_CHARS; ch_idx ++)
          if (ch_pts[ch_idx] > max_pts) {
            idx = ch_idx;
            max_pts = ch_pts[ch_idx];
          }
      strokes[s_idx].char_idx = idx;
      cs[idx].n_stk ++;
    }
  }
  set_box (&pen_range, 0, 0, getmaxx (), getmaxy ());
  return (MAX_STROKES);
} void redraw_strokes (int set_strokes)
/* Redraw the actual strokes in the boxes */
{
  register int s_idx, p_idx;
  n_strokes = set_strokes;
  redraw_box_in ();
  color (RED);
  mouse_hide ();
  for (s_idx = 0; s_idx < n_strokes; s_idx ++) {
    p_idx = strokes[s_idx].first;
    moveto (points[p_idx].x, points[p_idx].y);
    for (p_idx ++; p_idx <= strokes[s_idx].last; p_idx ++)
      lineto (points[p_idx].x, points[p_idx].y);
  }
  mouse_show ();
} void read_string (char *prompt, char *s, int len)
/* Read a string from keyboard and stores it in s */
/* Prompt is in var prompt and len is max lenght of s */
{
  int x = xd[2] + 3 * 8, y = (yd[10] + yd[11]) / 2;
  int maxl = min (len, ((xd[5] - xd[2]) / 8) - (2 * 3) - strlen (prompt));
  int sl, xl;
  char ch;
  message (" ");
  fillstyle (EMPTY_FILL);
  settextjustify (LEFT_TEXT, CENTER_TEXT);
```

```
    mouse_hide ();
    color (YELLOW);
    while (kbhit ()) bioskey (0);
    outtextxy (x, y, prompt);
    xl = x + strlen (prompt) * 8;
    color (GREEN);
    outtextxy (xl, y, s);
    sl = strlen (s);
    xl += sl * 8;
    while (1) {
      while (! kbhit ());
      ch = (char) bioskey (0);
      if (ch == 0x00) continue;
      if (ch == '\r') break;
      if (ch == '\b') {
        if (sl > 0) {
            sl --;
            s[sl] = '\0';
            xl -= 8;
            bar (xl, y - 5, xl + 8, y + 5);
        }
      }
      else if (sl < maxl) {
        s[sl] = ch;
        sl ++;
        s[sl] = '\0';
        outtextxy (xl, y, s + sl - 1);
        xl += 8;
      }
      else beep (500, 50);
    }
    fillstyle (SOLID_FILL);
    settextjustify (CENTER_TEXT, CENTER_TEXT);
    mouse_show ();
} char read_response (char *prompt, char *poss)
/* Return a char response from a choice in poss */
/* Prompt is in var prompt */
{
  char s[2] = "";
  strlwr (poss);
  do {
    read_string (prompt, s, 1);
    strlwr (s);
  } while (strchr (poss, *s) == NULL);
  return (*s);
} void set_fname_ext (char *fname, char *new_ext)
/* Set the extention new_ext in file name stored in fname */
{
  char drive[MAXDRIVE];
  char dir[MAXDIR];
  char file[MAXFILE];
  char ext[MAXEXT];
  fnsplit (fname, drive, dir, file, ext);
  fnmerge (fname, drive, dir, file, new_ext);
```

```c
  strlwr (fname);
} int wait_command ()
/* Wait for a menu key pressed and returns the number of it */
{
  register b;
  int status;
  coord c;
  while (1) {
    do status = mouse_read (&c);
    while (status == 0);
    for (b = 0; b < menu[cur_menu].elem; b ++)
      if (pt_in_box (c, buttons[b].b)) {
          color (WHITE);
          box (&buttons[b].b);
          wrtext (buttons[b].c.x, buttons[b].c.y, menu[cur_menu].mc[b].s);
          beep (2000, 30);
          mouse_cursor (ARROW_CURSOR);
          delay (300);
          color (LIGHTGREEN);
          box (&buttons[b].b);
          color (GREEN);
          wrtext (buttons[b].c.x, buttons[b].c.y, menu[cur_menu].mc[b].s);
          button_pressed = FALSE;
          return (b);
      }
  }
} void do_menu ()
/* Wait for a command and execute the related function */
{
  int command;
  message (menu[cur_menu].msg);
  command = wait_command ();
  if (menu[cur_menu].mc[command].func != NULL)
    menu[cur_menu].mc[command].func ();
} pragma warn -par int handler (int errval, int ax, int bp, int si)
/* It is the DOS critical errors handler */
{
  static char *err_msg[] = {
    "write protect",
    "unknown unit",
    "drive not ready",
    "unknown command",
    "data error (CRC)",
    "bad request",
    "seek error",
    "unknown media type",
    "sector not found",
    "printer out of paper",
    "write fault",
```

```
"read fault",
"general failure",
"reserved",
"reserved",
"invalid disk change"
};
errorcode ec = RETRY;
static char msg[80];
unsigned di;
int drive, errorno;
char ch;
di = _DI;
if (ax < 0) {
  warning ("Device error - Strike a key to abort");
  while (! kbhit ());
  hardretn (ABORT);
}
drive = ax & 0x00FF;
errorno = di & 0x00FF;
sprintf (msg, "Error: %s on drive %c", err_msg[errorno], 'A' + drive);
warning (msg);
message ("Abort, Retry or Ignore ?");
while (1) {
  if (kbhit ()) {
    ch = (char) bioskey (0);
    if (ch == 'a' || ch == 'A') ec = ABORT;
    else if (ch == 'r' || ch == 'R') ec = RETRY;
    else if (ch == 'i' || ch == 'I') ec = IGNORE;
    else continue;
    break;
  }
}
message (" ");
hardresume (ec);
return (ABORT);
} pragma warn +par void interrupt break_int ()
/* It is the Control-Break handler. Program rejects Control-Break */
{
} void init_args (int argc, char *argv[])
/* It sets some vars relating the program parameters */
{
  extern filename pattern_fname, code_fname;
  register int i;
  fputs ("\n\n ASMESI ver. 2.0\n"
         " Learning and Recognition of hand printed characters\n"
         " (C) 1992 by Texas Instruments Italia\n\n", stderr);
  delay (1000);
  if (argc > 1)
    for (i = 1; i < argc; i ++) {
      if (stricmp (argv[i], "/M") == 0) {
         monocrome = TRUE;
         continue;
```

```
    }
    if ((stricmp (argv[i], "/U") == 0) && (argc > i + 1)) {
        strcpy (pattern_fname, argv[i + 1]);
        strcpy (strokes_fname, argv[i + 1]);
        strcpy (code_fname, argv[i + 1]);
        set_fname_ext (pattern_fname, ".PTN");
        set_fname_ext (strokes_fname, ".STK");
        set_fname_ext (code_fname, ".COD");
        i ++;
        continue;
    }
    if ((stricmp (argv[i], "/C") == 0) && (argc > i + 1)) {
        strcpy (config_fname, argv[i + 1]);
        set_fname_ext (config_fname, ".CFG");
        i ++;
        continue;
    }
    if (stricmp (argv[i], "/H") == 0) {
        fputs ("\n Usage: ASMESI <options>\n"
            "\n Options are: /M (monocrome)\n"
            "             /U <user name> (user)\n"
            "             /C <file name> (config file)\n"
            "             /H (help)\n\n", stderr);
        exit (2);
        continue;
    }
  }
 }.
} void init_main ()
/* It sets interrupt handlers */
{
  harderr (handler);
  setvect (0x23, break_int);
} void init_vars ()
/* It initialize some vars which needs the allocation */
/* and configuration file is read */
{
  extern filename pattern_fname, features_fname, code_fname;
  extern int frame_th[], frame_band[];
  strcpy (strokes_fname, pattern_fname);
  *strchr (strokes_fname, '.') = '\0';
  set_fname_ext (strokes_fname, ".STK");
  set_fname_ext (pattern_fname, ".PTN");
  set_fname_ext (features_fname, ".FTR");
  set_fname_ext (code_fname, ".COD");
  set_fname_ext (config_fname, ".CFG");
  if (points != NULL) memfree (points);
  points = (coord *) memalloc (sizeof (coord) * MAX_POINTS);
  if (points == NULL) error ("Error allocating memory: not enough space");
  if (strokes != NULL) memfree (strokes);
  strokes = (stroke_type *) memalloc (sizeof (stroke_type) * MAX_STROKES);
  if (strokes == NULL) error ("Error allocating memory: not enough space");
  read_default (config_fname);
  frame_th[0] = frame_ln[0] - frame_band[0];
  frame_th[1] = frame_ln[1] + frame_band[1];
```

}

```c
bool frame_permit (char ch, int frame)
/* Return TRUE if the frame in var frame is permitted for char ch */
{
  register int i;
  if (learn_chars == NULL) return (TRUE);
  for (i = 0; i < n_learn_chars; i ++)
    if (learn_chars[i].ch == ch) break;
  if (i == n_learn_chars) return (TRUE);
  return (learn_chars[i].frame[frame]);
} int insert_chars (bool only_nc)
/* It inserts chars in data-base */
/* If only_nc is TRUE are inserted only chars which are not recognoized */
{
  #define char_skip (                                    \
      (cs[nc].id_in == ' ') ||                           \
      (cs[nc].frame < 1) ||                              \
      (cs[nc].frame > 7) ||                              \
      (only_nc && (cs[nc].id_out == cs[nc].id_in))       \
  )
  extern filename pattern_fname;
  FILE *pattern_file, *strokes_file;
  register int i, j;
  register row w;
  int nc, nca;
  char s[COLS + 2];
  row mask = (row) 1 << (COLS - 1);
  strokes_file = fopen (strokes_fname, "ab");
  pattern_file = fopen (pattern_fname, "a");
  if ((pattern_file == NULL) && (strokes_file == NULL))
    warning ("Cannot insert characters");
  if (strokes_file != NULL) {
    for (nca = nc = 0; nc < N_CHARS; nc ++) {
      if (char_skip) continue;
      else nca ++;
      fwrite (&cs[nc].id_in, sizeof (char), 1, strokes_file);
      fwrite (&cs[nc].n_stk, sizeof (int), 1, strokes_file);
      fwrite (&nc, sizeof (int), 1, strokes_file);
      fwrite (&cs[nc].box_in, sizeof (cbox), 1, strokes_file);
      for (i = 0; i < n_strokes; i ++) {
          int pts = strokes[i].last - strokes[i].first + 1;
          if ((strokes[i].char_idx) != nc) continue;
          fwrite (&pts, sizeof (int), 1, strokes_file);
          fwrite (&points[strokes[i].first], sizeof (coord), pts, strokes_file);
      }
    }
    fclose (strokes_file);
  }
  if (pattern_file != NULL) {
    s[COLS] = '\n';
    s[COLS + 1] = '\0';
    for (nca = nc = 0; nc < N_CHARS; nc ++) {
      if (char_skip) continue;
      else nca ++;
      fprintf (pattern_file, "CHAR %c  STROKES %d  FRAME %d\n",
```

```c
            cs[nc].id_in, cs[nc].n_stk, cs[nc].frame);
        for (i = 0; i < ROWS; i ++) {
            w = cs[nc].mat[i];
            for (j = 0; j < COLS;  w <<= 1, j ++)
                if ((w & mask) != 0) s[j] = CHAR_1;
                else s[j] = CHAR_0;
            fputs (s, pattern_file);
        }
    }
    fclose (pattern_file);
  }
  return (nca);
} void clear_chars ()
/* It clears some vars related to video char structure */
{
  register int i, j;
  if (n_strokes > 0)
    redraw_strokes (0);
  for (i = 0; i < N_CHARS; i ++)
    for (j = 0; j < ROWS; j ++)
      cs[i].mat[j] = 0;
  for (i = 0; i < N_CHARS; i ++) {
    cs[i].id_in = cs[i].id_out = ' ';
    cs[i].n_stk = 0;
    cs[i].frame = 0;
  }
  redraw_box_out ();
  redraw_id_in ();
  redraw_id_out (0);
} bool load_learnchar ()
/* It loads the file for learning */
{
  register int i, j;
  FILE *learnchar_file;
  char s[128];
  int pf[8];
  learnchar_file = fopen (learnchar_fname, "r");
  if (learnchar_file == NULL) {
    warning ("Cannot open learning file");
    learning = FALSE;
    return (FALSE);
  }
  n_learn_chars = get_elements (learnchar_file, 1);
  if (learn_chars != NULL) memfree (learn_chars);
  learn_chars = (charframe *) memalloc (n_learn_chars * sizeof (charframe));
  if (learn_chars == NULL) {
    warning ("Cannot allocate learning file");
    learning = FALSE;
    return (FALSE);
  }
  for (i = 0; i < n_learn_chars; i ++) {
    for (j = 0; j < 8; j ++) {
      pf[j] = -1;
      learn_chars[i].frame[j] = FALSE;
```

```
        }
        fgets (s, 127, learnchar_file);
        sscanf (s, "%c %d %d %d %d %d %d %d %d", &learn_chars[i].ch,
                &pf[0], &pf[1], &pf[2], &pf[3],
                &pf[4], &pf[5], &pf[6], &pf[7]);
        for (j = 0; j < 8; j ++)
            if (pf[j] != -1)
                learn_chars[i].frame[pf[j]] = TRUE;
            else break;
        learn_chars[i].frame[0] = FALSE;
        if (j == 0)
            for (j = 1; j < 8; j ++)
                learn_chars[i].frame[j] = TRUE;
    }
    fclose (learnchar_file);
    return (TRUE);
} bool get_learning_char (bool first, bool stop)
/* It gets learning char number cur_learn_char */
/* If var first is TRUE then entry routines are performed */
/* If var stop is TRUE then exit routines are performed */
{
    static char *learn_msg = "Write character _";
    clear_chars ();
    if (first) {
        if (! load_learnchar ()) return (FALSE);
        cur_learn_idx = 0;
    }
    else cur_learn_idx ++;
    if ((cur_learn_idx == n_learn_chars) || stop) {
        save_code ();
        learning = FALSE;
        return (FALSE);
    }
    learn_msg[16] = learn_chars[cur_learn_idx].ch;
    message (learn_msg);
    return (TRUE);
} void write_chars ()
/* It permits getting char strokes */
{
    redraw_buttons (MENU_WRITE);
    if (learning)
        if (! get_learning_char (TRUE, FALSE)) {
            redraw_buttons (MENU_ROOT);
            return;
        }
    n_strokes = get_strokes ();
} void menu_write_back ()
/* It clears last stroke */
{
    if (n_strokes > 0)
        redraw_strokes (n_strokes - 1);
```

```c
  n_strokes = get_strokes ();
} void menu_write_clear ()
/* It clears all strokes */
{
  clear_chars ();
  n_strokes = get_strokes ();
} void menu_write_return ()
/* The routines for getting chars are performed */
{
  extern codex *cod;
  register int i;
  static char *msgnca = "Accepted chars:   ";
  bool stop;
  int nca;
  make_matrix (TRUE);
  redraw_box_out ();
  if (learning) {
    redraw_id_out (1);
    for (i = 0; i <= N_CHARS; i ++) {
      if (cs[i].frame != 0) cs[i].id_in = learn_chars[cur_learn_idx].ch;
      else cs[i].id_in = ' ';
      if (! frame_permit (cs[i].id_in, cs[i].frame)) cs[i].frame = 0;
    }
    redraw_id_in ();
    nca = insert_chars (FALSE);
    sprintf (msgnca + 16, "%d", nca);
    warning (msgnca);
    if (cur_learn_idx == n_learn_chars - 1) stop = TRUE;
    else stop = read_response ("Continue ? [Yes or No] ", "yn") == 'n';
    get_learning_char (FALSE, stop);
  }
  else {
    if (cod == NULL) {
      redraw_id_out (1);
      warning ("Cannot recognize characters");
    }
    else {
      mouse_cursor (TIME_CURSOR);
      message ("Recognition in progress");
      for (i = 0; i < N_CHARS; i ++)
          test_char (&cs[i]);
      redraw_id_out (2);
      mouse_cursor (ARROW_CURSOR);
    }
  }
  if (learning) n_strokes = get_strokes ();
  else redraw_buttons (MENU_ROOT);
} void menu_learning ()
/* Learning procedure */
{
  learning = TRUE;
```

```c
  write_chars ();
} void menu_recognize ()
/* Recognize procedure */
{
  write_chars ();
} void menu_insert ()
/* It allows char insertion in data-base */
{
  register int i;
  char ca, id[N_CHARS + 1] = "";
  read_string ("String: ", id, N_CHARS);
  for (i = 0; id[i] != '\0'; i ++)
    cs[i].id_in = id[i];
  for ( ; i < N_CHARS; i ++)
    cs[i].id_in = ' ';
  redraw_id_in ();
  ca = read_response ("1. All  2. Not recognized  3. None -> ", "123");
  if (ca == '3') return;
  load_learnchar ();
  for (i = 0; i <= N_CHARS; i ++)
    if (! frame_permit (cs[i].id_in, cs[i].frame)) cs[i].frame = 0;
  insert_chars (ca == '2');
  remake_code (cs, N_CHARS, ca == '2');
} void menu_zoom ()
/* It allows zooming of char matrices */
{
  redraw_buttons (MENU_ZOOM);
  zoom_char_mat (0);
} void menu_zoom_previous ()
/* It allows zooming of previous char */
{
  zoom_char_mat (-1);
} void menu_zoom_next ()
/* It allows zooming of next char */
{
  zoom_char_mat (1);
} void menu_zoom_return ()
/* Exit routines for zooming are performed */
{
  zoom_char_mat (2);
  redraw_buttons (MENU_ROOT);
}
```

```
void menu_setup ()
/* The menu of setup is called */
{
  redraw_buttons (MENU_OPTIONS);
} void menu_setup_filenames ()
/* The menu of file names setup is called */
{
  extern codex *cod;
  extern filename pattern_fname, features_fname, code_fname;
  filename bakstrokes_fname, bakcode_fname;
  strcpy (bakstrokes_fname, strokes_fname);
  strcpy (bakcode_fname, code_fname);

read_string ("Strokes [.STK]: ", strokes_fname, MAXPATH);
  set_fname_ext (strokes_fname, ".STK");

if (strcmp (strokes_fname, bakstrokes_fname) != 0) {
    strcpy (pattern_fname, strokes_fname);
    strcpy (code_fname, strokes_fname);
    set_fname_ext (pattern_fname, ".PTN");
    set_fname_ext (code_fname, ".COD");
  } read_string ("Patterns [.PTN]: ", pattern_fname, MAXPATH);
  set_fname_ext (pattern_fname, ".PTN");

read_string ("Features [.FTR]: ", features_fname, MAXPATH);
  set_fname_ext (features_fname, ".FTR");

read_string ("Code [.COD]: ", code_fname, MAXPATH);
  set_fname_ext (code_fname, ".COD");

read_string ("Configuration file [.CFG]: ", config_fname, MAXPATH);
  set_fname_ext (config_fname, ".CFG");

if ((cod != NULL) && strcmp (code_fname, bakcode_fname) != 0)
    make_code ();
} void menu_setup_default ()
/* It allows the setup of some vars for scaling and recognition */
{
  extern int frame_th[2], frame_band[2],
    punct_th_x, punct_th_y, comma_th_x, comma_th_y,
    n_thresholds, th[16],
    strokes_weight, vars_weight, punct_weight,
    thresh_fact, asp_x, asp_y;
  char *sp, s[31], s1[11];
  register int i;

sprintf (s, "%d %d", 100 - frame_ln[1], 100 - frame_ln[0]);
  read_string ("Framing lines (lower & upper) in %: ", s, 30);
  sscanf (s, "%d %d", &frame_ln[1], &frame_ln[0]);
  frame_ln[0] = 100 - frame_ln[0];
```

```
frame_ln[1] = 100 - frame_ln[1];

sprintf (s, "%d %d", frame_band[1], frame_band[0]);
read_string ("Framing bands (lower & upper): ", s, 30);
sscanf (s, "%d %d", &frame_band[1], &frame_band[0]);
frame_th[0] = frame_ln[0] - frame_band[0];
frame_th[1] = frame_ln[1] + frame_band[1];

init_frame_pos ();
redraw_strokes (n_strokes);

s[0] = '\0';
for (i = 0; i < n_thresholds; i ++) {
  sprintf (s1, " %d", th[i]);
  strcat (s, s1);
}
read_string ("Thresholds list: ", s, 30);
sp = strtok (s, " ,");
n_thresholds = 0;
while (sp != NULL) {
  th[n_thresholds] = atoi (sp);
  n_thresholds ++;
  sp = strtok (NULL, " ,");
} sprintf (s, "%d", strokes_weight);
read_string ("Strokes weight in recognition: ", s, 10);
strokes_weight = atoi (s);

sprintf (s, "%d", vars_weight);
read_string ("Intersections weight in recognition: ", s, 10);
vars_weight = atoi (s);

sprintf (s, "%d", punct_weight);
read_string ("Punctuation weight in recognition: ", s, 10);
punct_weight = atoi (s);

sprintf (s, "%d %d", asp_x, asp_y);
read_string ("Aspect in scaling (X and Y): ", s, 30);
sscanf (s, "%d %d", &asp_x, &asp_y);

sprintf (s, "%d", thresh_fact);
read_string ("Threshold factor in scaling: ", s, 30);
sscanf (s, "%d", &thresh_fact);

sprintf (s, "%d %d", punct_th_x, punct_th_y);
read_string ("Thresholds for punctuation (X and Y): ", s, 30);
sscanf (s, "%d %d", &punct_th_x, &punct_th_y);

sprintf (s, "%d %d", comma_th_x, comma_th_y);
read_string ("Thresholds for comma (X and Y): ", s, 30);
sscanf (s, "%d %d", &comma_th_x, &comma_th_y);
} void menu_setup_loadcode ()
/* It allows to load code */
{
  message ("Loading code");
  mouse_cursor (TIME_CURSOR);
```

```c
  if (! load_code ()) warning ("Cannot read code file");
  mouse_cursor (ARROW_CURSOR);
} void menu_setup_makecode ()
/* It allows to create new code and load it */
{
  extern int n_chars;
  char s[30];
  int cp;
  mouse_cursor (TIME_CURSOR);
  message ("Making code");
  if (! make_code ()) {
    warning ("Cannot make code");
    mouse_cursor (ARROW_CURSOR);
    return;
  }
  message ("Purging code");
  cp = purge_code ();
  if (cp > 0) {
    sprintf (s, "%d chars purged on %d", cp, n_chars);
    warning (s);
  }
  message ("Saving code");
  if (! save_code ())
    warning ("Cannot save code file");
  mouse_cursor (ARROW_CURSOR);
} void menu_setup_return ()
/* It permits to exit from setup menu */
{
  redraw_buttons (MENU_ROOT);
} void menu_quit ()
/* It allows to exit from program */
{
  char yn;
  yn = read_response ("Are you sure ? [Yes or No] ", "yn");
  if (yn != 'y') return;
  close_graphics ();
  write_default (config_fname);
  exit (0);
} void main (int argc, char *argv[])
/* Main procedure */
{
  init_args (argc, argv);
  init_main ();
  init_vars ();
  init_graphics ();
  init_layout ();
  layout ();
  while (1) do_menu ();
}
```

* PARMS.C *

```c
#include "options.h"

#include <stdio.h>
#include <stdlib.h>
#include <string.h>
include <dir.h> include "typedef.h"
include "parms.h"

extern int frame_th[2], frame_band[2], frame_ln[2];
extern int n_thresholds, th[16];
extern int strokes_weight, vars_weight;

bool read_default (filename parms_fname)
/* It reads the default values of some vars from file */
{
  FILE *parms_file;
  char s[128], command[30];

parms_file = fopen (parms_fname, "r");
  if (parms_file == NULL) return (FALSE);
  while (fgets (s, 128, parms_file) != NULL) {
    sscanf (s, "%s", command);
    if (stricmp (command, "FRAMING_LINES") == 0) {
      sscanf (s, "%s %d %d", command, &frame_ln[1], &frame_ln[0]);
      frame_ln[0] = 100 - frame_ln[0];
      frame_ln[1] = 100 - frame_ln[1];
      continue;
    }
    if (stricmp (command, "FRAMING_BANDS") == 0) {
      sscanf (s, "%s %d %d", command, &frame_band[1], &frame_band[0]);
      frame_th[0] = frame_ln[0] - frame_band[0];
      frame_th[1] = frame_ln[1] + frame_band[1];
      continue;
    }
    if (stricmp (command, "THRESHOLDS_LIST") == 0) {
      n_thresholds = sscanf (s, "%s %d %d %d %d %d %d %d %d %d %d %d %d %d %d %d %d",
          command, &th[0], &th[1], &th[2], &th[3], &th[4], &th[5], &th[6],
          &th[7], &th[8], &th[9], &th[10], &th[11], &th[12], &th[13],
          &th[14], &th[15]) - 1;
      continue;
    }
    if (stricmp (command, "STROKES_WEIGHT") == 0) {
      sscanf (s, "%s %d", command, &strokes_weight);
      continue;
    }
    if (stricmp (command, "INTERSECTIONS_WEIGHT") == 0) {
      sscanf (s, "%s %d", command, &vars_weight);
      continue;
    }
  }
  fclose (parms_file);
```

```
  return (TRUE);
} bool write_default (filename parms_fname)
/* It writes the values of some vars to file */
{
  FILE *parms_file;
  register int i;

parms_file = fopen (parms_fname, "w");
  if (parms_file == NULL) return (FALSE);
  fprintf (parms_file, "FRAMING_LINES %d %d\n", 100 - frame_ln[1], 100 - frame_ln[0]);
  fprintf (parms_file, "FRAMING_BANDS %d %d\n", frame_band[1], frame_band[0]);
  fprintf (parms_file, "THRESHOLDS_LIST");
  for (i = 0; i < n_thresholds; i ++) {
    fprintf (parms_file, " %d", th[i]);
  }
  fprintf (parms_file, "\n");
  fprintf (parms_file, "STROKES_WEIGHT %d\n", strokes_weight);
  fprintf (parms_file, "INTERSECTIONS_WEIGHT %d\n", vars_weight);
  fclose (parms_file);
  return (TRUE);
}
```

* GRAPH.C *

```c
#include "options.h"

#include <stdio.h>
#include <stdlib.h>
#include <dos.h>
#include <bios.h>
#include <dir.h>
#include <graphics.h>
#include <string.h>
include <values.h> include "typedef.h"
include "graph.h"

extern bool monocrome;
extern int xd[], yd[];

define int33(func) { _AX = func; geninterrupt (0x33); } void beep (word f, word d)
/* It beeps */
{
  sound (f);
  delay (d);
  nosound ();
} void set_coord (coord *c, int x, int y)
/* It sets a coord with x and y values */
{
  c->x = x;
  c->y = y;
} void set_box (cbox *b, int x1, int y1, int x2, int y2)
/* It sets rectangle with values x1, y1, x2 and y2 */
{
  b->min.x = x1;
  b->min.y = y1;
  b->max.x = x2;
  b->max.y = y2;
} void color (int clr)
/* It sets graphics color */
{
  if (monocrome) return;
  setcolor (clr);
}
```

```c
void fillstyle (int style)
/* It sets fill style and color in graphics */
{
  #define FILLCOLOR LIGHTGRAY
  if (monocrome) setfillstyle (style, WHITE);
  else setfillstyle (style, FILLCOLOR);
} bool mouse_init ()
/* It initialize mouse driver */
{
  #define IRET 0xcf extern cbox pen_range;
  char far *int33vect;
  int33vect = (char far *) getvect (0x33);
  if (int33vect == NULL) return (FALSE);
  if (*int33vect == IRET) return (FALSE);
  int33 (0);
  if (_AX == 0) return (FALSE);
  set_box (&pen_range, 0, 0, getmaxx (), getmaxy ());
  return (TRUE);
} void mouse_show ()
/* It shows mouse cursor */
{
  int33 (1);
} void mouse_hide ()
/* It hides mouse cursor */
{
  int33 (2);
} void mouse_cursor (cursor_type cur)
/* It change mouse shape */
{
  static graphic_cursor cursor [3] = {
    { { 0x3fff, 0x1fff, 0x0fff, 0x07ff, 0x03ff, 0x01ff, 0x00ff, 0x007f,
        0x003f, 0x007f, 0x01ff, 0x10ff, 0xb0ff, 0xf87f, 0xf87f, 0xfcff },
      { 0x0000, 0x4000, 0x6000, 0x7000, 0x7800, 0x7c00, 0x7e00, 0x7f00,
        0x7f80, 0x7c00, 0x6c00, 0x4600, 0x0600, 0x0300, 0x0300, 0x0000 },
      -1, -1 },
    { { 0xf3ff, 0xe1ff, 0xe1ff, 0xe049, 0xe000, 0xe000, 0x0000, 0x0000,
        0x0000, 0x0000, 0x0000, 0x8000, 0xc001, 0xe003, 0xf003, 0xf003 },
      { 0x0000, 0x0c00, 0x0c00, 0x0c00, 0x0db6, 0x0db6, 0x0db6, 0x6db6,
        0x6ffe, 0x7ffe, 0x7ffe, 0x3ffe, 0x1ffc, 0x0ff8, 0x07f8, 0x0000 },
      3, 0 },
    { { 0x0001, 0x0001, 0x0001, 0x0001, 0x0001, 0x0001, 0x0001, 0x0001,
        0x0001, 0x0001, 0x0001, 0x0001, 0x0001, 0x0001, 0x0001, 0xffff },
      { 0x0000, 0x7ffc, 0x4104, 0x4004, 0x4804, 0x4404, 0x4204, 0x610c,
        0x4104, 0x4104, 0x4104, 0x4004, 0x4104, 0x7ffc, 0x0000, 0x0000 },
      0, 0 }
```

```
  };
  static cursor_type current = ARROW_CURSOR;
  int hx, hy;
  if (current == cur) return;
  hx = cursor[cur].hotX;
  hy = cursor[cur].hotY;
  _BX = hx;
  _CX = hy;
  _ES = FP_SEG (&cursor[cur].screenmask);
  _DX = FP_OFF (&cursor[cur].screenmask);
  _AX = 9;
  geninterrupt (0x33);
  current = cur;
} bool pt_in_menu (coord *pt)
/* It returns TRUE if point defined by coord pt is the current menu area */
{
  extern but_struct buttons[];
  extern menutype menu[];
  extern menu_type cur_menu;
  if (pt->x < buttons[0].b.min.x) return (FALSE);
  if (pt->y < buttons[0].b.min.y) return (FALSE);
  if (pt->x > buttons[menu[cur_menu].elem - 1].b.max.x) return (FALSE);
  if (pt->y > buttons[menu[cur_menu].elem - 1].b.max.y) return (FALSE);
  return (TRUE);
} void box (cbox *b)
/* It draw a rectangle defined by b */
{
  mouse_hide ();
  rectangle (b->min.x, b->min.y, b->max.x, b->max.y);
  mouse_show ();
} void del_rect (cbox *cb)
/* It delete a rectangle defined by cb */
{
  fillstyle (EMPTY_FILL);
  mouse_hide ();
  bar (cb->min.x, cb->min.y, cb->max.x, cb->max.y);
  mouse_show ();
  fillstyle (SOLID_FILL);
} void wrtext (int x, int y, char *s)
/* It writes a string s in position defined by x and y */
{
  mouse_hide ();
  outtextxy (x, y, s);
  mouse_show ();
} void wrchar (int x, int y, char c)
/* It writes a char in position defined by x and y */
```

```
{
  char s[2] = " ";
  s[0] = c;
  mouse_hide ();
  outtextxy (x, y, s);
  mouse_show ();
} int mouse_read (coord *c)
/* It read the mouse position and store it in c */
/* It returns the mouse status */
{
  extern bool button_pressed;
  static int pstatus = 0;
  int status;
  bool pt_menu;
  coord cl;
  int33 (3);
  status = _BX;
  cl.x = _CX;
  cl.y = _DX;
  pt_menu = pt_in_menu (&cl);
  if (pt_menu)
    mouse_cursor (HAND_CURSOR);
  else mouse_cursor (ARROW_CURSOR);
  if (pt_menu && (pstatus == 0) && (status != 0)) {
    mouse_cursor (ARROW_CURSOR);
    button_pressed = TRUE;
  }
  pstatus = status;
  c->x = cl.x;
  c->y = cl.y;
  return (status);
} void mouse_set (int x, int y)
/* It sets the mouse cursor position in the point defined by x and y */
{
  _CX = x;
  _DX = y;
  int33 (4);
} void init_graphics ()
/* It initialize graphics */
{
  int gdriver = DETECT, gmode, errorcode;
  char s[80];
  registerbgidriver (EGAVGA_driver);
  registerbgifont (triplex_font);
  initgraph (&gdriver, &gmode, "");
  errorcode = graphresult ();
  if (errorcode != grOk) {
    sprintf (s, "Graphics error: %s\n", grapherrormsg (errorcode));
    error (s);
  }
  setcolor (WHITE);
```

```c
fillstyle (SOLID_FILL);
settextjustify (CENTER_TEXT, CENTER_TEXT);
settextstyle (DEFAULT_FONT, HORIZ_DIR, 1);
setlinestyle (SOLID_LINE, 0, 1);
if (mouse_init ()) {
  mouse_cursor (ARROW_CURSOR);
  mouse_set (getmaxx () / 2, getmaxy () / 2);
  mouse_show ();
}
else {
  closegraph ();
  error ("Cannot inizialize mouse driver");
}
} void close_graphics ()
/* It close the graphics */
{
  cbox cb;
  set_box (&cb, 0, 0, getmaxx (), getmaxy ());
  mouse_hide ();
  del_rect (&cb);
  closegraph ();
} void message (char *s)
/* It displays the message s */
{
  cbox cb;
  if (*s == '\0') return;
  set_box (&cb, xd[2], yd[10], xd [5], yd[11]);
  del_rect (&cb);
  color (RED);
  box (&cb);
  wrtext ((cb.min.x + cb.max.x) / 2, (cb.min.y + cb.max.y) / 2, s);
} void warning (char *s)
/* It displays the message s and beeps */
{
  message (s);
  beep (500, 100);
  delay (2000);
} void error (char *err)
/* It exit to DOS with error message err */
{
  printf ("\n\n%s\n\n", err);
  exit (1);
} void redraw_logo ()
/* It redraw Texas Instrumets logo */
{
```

```
static coord texas_logo_1[] = {
  { 63, 137 }, { 63,  93 }, { 93,  93 }, { 93, 109 }, { 94, 111 },
  { 94, 113 }, { 96, 115 }, { 98, 116 }, { 96, 131 }, { 86, 131 },
  { 84, 144 }, { 93, 144 }, { 89, 168 }, { 89, 170 }, { 91, 173 },
  { 92, 175 }, { 96, 177 }, { 98, 177 }, { 102, 177 }, { 105, 177 },
  { 108, 175 }, { 110, 173 }, { 110, 169 }, { 108, 168 }, { 107, 167 },
  { 106, 165 }, { 106, 163 }, { 107, 160 }, { 110, 144 }, { 118, 144 },
  { 120, 131 }, { 111, 131 }, { 114, 119 }, { 117, 118 }, { 119, 117 },
  { 123, 116 }, { 126, 117 }, { 129, 118 }, { 133, 119 }, { 138, 122 },
  { 137, 127 }, { 137, 134 }, { 138, 137 }, { 142, 146 }, { 143, 148 },
  { 142, 156 }, { 141, 159 }, { 140, 163 }, { 117, 181 }, { 115, 184 },
  { 112, 186 }, { 111, 190 }, { 111, 193 }, { 112, 196 }, { 113, 199 },
  { 115, 202 }, { 111, 208 }, { 101, 206 }, { 95, 200 }, { 88, 192 },
  { 82, 180 }, { 79, 169 }, { 70, 169 }, { 66, 172 }, { 63, 174 },
  { 61, 174 }, { 59, 172 }, { 54, 168 }, { 49, 157 }, { 38, 148 },
  { 35, 144 }, { 34, 141 }, { 34, 137 }, { 63, 137 }, { -1, -1 }
};
static coord texas_logo_2[] = {
  { 102, 121 }, { 109, 121 }, { 102, 162 }, { 95, 162 }, { 102, 121 },
  { -1, -1 }
};
static coord texas_logo_3[] = {
  { 108, 105 }, { 4, 4 }
};
int *poly;
register int i;
color (YELLOW);
settextstyle (TRIPLEX_FONT, HORIZ_DIR, 4);
wrtext (xd[6], yd[14], "TI HPCR");
settextstyle (DEFAULT_FONT, HORIZ_DIR, 1);
color (BROWN);
if (! monocrome) setfillstyle (SOLID_FILL, BROWN);
for (i = 0; texas_logo_1[i].x != -1; i ++);
poly = (int *) texas_logo_1;
fillpoly (i, poly);
for (i = 0; texas_logo_2[i].x != -1; i ++);
poly = (int *) texas_logo_2;
fillpoly (i, poly);
fillellipse (texas_logo_3[0].x, texas_logo_3[0].y,
             texas_logo_3[1].x, texas_logo_3[1].y);
fillstyle (SOLID_FILL);
}
```

* TOOL16.C *

```c
#include "options.h"

#include <stdio.h>
#include <stdlib.h>
#include <string.h>
include <dir.h>
#include <dos.h>
include <values.h> include "typedef.h"
include "tool16.h"

matrix *features = NULL;
codex *cod = NULL;
byte *test_f = NULL;
int n_features, n_thresholds = 3, n_chars, min_diff = 0;
int th[16] = { 2, 3, 6 };
static int n_chars_purged = 0;
static int n_chars_prev = 0;
int strokes_weight = 15, vars_weight = 2;
filename pattern_fname = "SAMPLE.PTN", features_fname = "FEATURES.FTR",
  code_fname = "SAMPLE.COD";

int get_elements (FILE *f, int rows)
/* It returns the elements number from file f */
/* The var rows contains the number of rows of each element */
{
  register long elem = 0L;
  char s[255];
  register char *ps;
  long fp = ftell (f);
  fseek (f, 0L, SEEK_SET);
  while (fgets (s, 255, f) != NULL) {
    for (ps = s; *ps != '\0'; ps ++)
      if (*ps != ' ') {
          elem ++;
          break;
      }
    if (*ps == '\0') break;
  }
  fseek (f, fp, SEEK_SET);
  return (elem / rows);
} static int c_bits (matrix m1, matrix m2)
/* It returns the number of common bits between the matrices m1 and m2 */
{
  register int i;
  int count = 0;
  register row w;
  for (i = 0; i < ROWS; i ++)
    for (w = m1[i] & m2[i]; w != 0; w >>= 1)
      if (w & 1) count ++;
  return (count);
}
```

```
static int threshold (int cb)
/* It returns the number of the threshold associated to integer cb */
{
  register int i;
  for (i = 0; i < n_thresholds; i ++)
    if (cb < th[i]) break;
  return (i);
} static void load_matrix (FILE *f, matrix m)
/* It loads a matrix from file f and stores it in m */
{
  register int i, j;
  char s[COLS+20], rw[COLS+1];
  row w;
  for (i = 0; i < ROWS; i ++) {
    fgets (s, COLS+40, f);
    sscanf (s, "%s", rw);
    for (j = 0, w = 0; j < COLS; j ++) {
      w <<= 1;
      if ((rw[j] == '1') || (rw[j] == '#')) w |= 1;
    }
    m[i] = w;
  }
} void load_char (FILE *f, char_struct *chs)
/* It loads whole char informations from file f and stores them in chs */
{
  register int i;
  char s[COLS+128];
  fgets (s, COLS+128, f);
  sscanf (s, "CHAR %c  STROKES %d  FRAME %d\n",
    &chs->id_in, &chs->n_stk, &chs->frame);
  load_matrix (f, chs->mat);
  make_vars_xy (chs);
} static bool alloc_features ()
/* It allocates features vector */
{
  if (features != NULL) {
    memfree (features);
    memfree (test_f);
  }
  features = (matrix *) memalloc (n_features * sizeof (matrix));
  if (features == NULL)
    return (FALSE);
  test_f = (byte *) memalloc (n_features * sizeof (byte));
  if (test_f == NULL) {
    memfree (features);
    return (FALSE);
  }
  return (TRUE);
}
```

```c
static bool load_features (char *features_fname)
/* It loads from file features_file the features */
{
  FILE *features_file;
  register int i;
  features_file = fopen (features_fname, "r");
  if (features_file == NULL) return (FALSE);
  n_features = get_elements (features_file, ROWS);
  if (! alloc_features ()) {
    fclose (features_file);
    return (FALSE);
  }
  for (i = 0; i < n_features; i ++)
    load_matrix (features_file, features[i]);
  fclose (features_file);
  return (TRUE);
} static bool alloc_code ()
/* It allocates the code var */
{
  register int i, j;
  if (cod != NULL) {
    for (i = 0; i < n_chars_prev; i ++)
      memfree (cod[i].ftr);
    memfree (cod);
  }
  cod = (codex *) memalloc (n_chars * sizeof (codex));
  if (cod == NULL) return (FALSE);
  for (i = 0; i < n_chars; i ++) {
    cod[i].ftr = (byte *) memalloc (n_features * sizeof (byte));
    if (cod[i].ftr == NULL) break;
  }
  if (i != n_chars) {
    for (j = 0; j < i; j ++)
      memfree (cod[j].ftr);
    memfree (cod);
    return (FALSE);
  }
  n_chars_prev = n_chars;
  return (TRUE);
} static bool realloc_code (int n_news)
/* It reallocate the code var with new dimension n_news */
{
  register int i, j;
  if (n_news == 0) return (TRUE);
  n_chars = n_chars_prev + n_news;
  if (cod == NULL) {
    if (! load_features (features_fname)) return (FALSE);
    return (alloc_code ());
  }
  cod = (codex *) realloc (cod, n_chars * sizeof (codex));
  if (cod == NULL) return (FALSE);
  for (i = n_chars_prev; i < n_chars; i ++) {
```

```c
      cod[i].ftr = (byte *) memalloc (n_features * sizeof (byte));
      if (cod[i].ftr == NULL) break;
    }
    if (i != n_chars) {
      for (j = 0; j < i; j ++)
        memfree (cod[j].ftr);
      memfree (cod);
      return (FALSE);
    }
    n_chars_prev = n_chars;
    return (TRUE);
  } static int cmp_strokes (int s1, int s2)
  /* It returns the weighted difference strokes number s1 and s2 */
  {
    register int delta;
    delta = strokes_weight * abs (s1 - s2);
    return (delta);
  } static int cmp_vars (var_xy v1[], var_xy v2[])
  /* It returns the weighted difference intersections vectors v1 and v2 */
  {
    register int i, delta = 0;
    for (i = 0; i < COLS; i ++)
      delta += abs (v1[i].x - v2[i].x);
    for (i = 0; i < ROWS; i ++)
      delta += abs (v1[i].y - v2[i].y);
    delta *= vars_weight;
    return (delta);
  } static int cmp_features (byte *f1, byte *f2, int initd, int mind)
  /* It returns the difference for features vectors f1 and f2 */
  /* The return value is initialize with initd */
  /* If during the calculation the return value is greater than mind */
  /* than the function returns */
  {
    register int i, delta;
    for (delta = initd, i = n_features - 1; i >= 0; i --) {
      delta += abs (f1[i] - f2[i]);
      if (delta > mind) break;
    }
    return (delta);
  } int purge_code ()
  /* It purge coded chars identical */
  {
    #define DELTA_OBS 0
    int d_obs = DELTA_OBS;
    long ch_purged = 0L;
    register int i, j;
    for (i = 0; i < n_chars - 1; i ++)
      for (j = i + 1; j < n_chars; j ++) {
```

```
    if (cod[i].obs) continue;
    if (cod[j].obs) continue;
    if (cod[i].ch != cod[j].ch) continue;
    if (cod[i].frame != cod[j].frame) continue;
    if ((cmp_features (cod[i].ftr, cod[j].ftr, 0, d_obs) <= d_obs) &&
        (cmp_vars (cod[i].var, cod[j].var) == 0) &&
        (cmp_strokes (cod[i].n_stk, cod[i].n_stk) == 0)) {
      cod[j].obs = TRUE;
      ch_purged ++;
    }
  }
  n_chars_purged = ch_purged;
  return (ch_purged);
} static bool code_char (char_struct *chs, codex *chc, bool only_nc)
/* It trasforms video char chs in coded char chc */
{
  register int i;
  if (chs->id_in == ' ') return (FALSE);
  if (only_nc && (chs->id_in == chs->id_out)) return (FALSE);
  chc->ch = chs->id_in;
  chc->n_stk = chs->n_stk;
  chc->frame = chs->frame;
  for (i = 0; i < max (COLS, ROWS); i ++)
    chc->var[i] = chs->var[i];
  for (i = 0; i < n_features; i ++)
    chc->ftr[i] = threshold (c_bits (chs->mat, features[i]));
  chc->obs = FALSE;
  return (TRUE);
} bool make_code ()
/* It make code in memory */
{
  FILE *pattern_file;
  register int i;
  char_struct chs;
  if (! load_features (features_fname)) return (FALSE);
  pattern_file = fopen (pattern_fname, "r");
  if (pattern_file == NULL) return (FALSE);
  n_chars = get_elements (pattern_file, ROWS + 1);
  if (! alloc_code ()) {
    fclose (pattern_file);
    return (FALSE);
  }
  for (i = 0; i < n_chars; i ++) {
    load_char (pattern_file, &chs);
    code_char (&chs, &cod[i], FALSE);
  }
  fclose (pattern_file);
  return (TRUE);
} bool remake_code (char_struct cs[], int nch, bool only_nc)
/* It create new coded chars and adds them to code */
{
```

```c
  register int nc, i;
  int n_news = 0, n_prev;
  for (nc = 0; nc < nch; nc ++)
    if (cs[nc].id_in != ' ') {
      if (only_nc && (cs[nc].id_in == cs[nc].id_out)) continue;
      else n_news ++;
    }
  n_prev = n_chars_prev;
  if (! realloc_code (n_news)) return (FALSE);
  for (nc = 0, i = n_prev; nc < nch; nc ++)
    if (code_char (&cs[nc], &cod[i], only_nc)) i ++;
  return (TRUE);
} bool save_acode (filename acode_fname)
/* It save part of code in ASCII format to file acode_fname */
{
  FILE *acode_file;
  register int i;
  int dimx = COLS, dimy = ROWS;
  if (cod == NULL) return (FALSE);
  acode_file = fopen (acode_fname, "w");
  if (acode_file == NULL) return (FALSE);
  fprintf (acode_file, "Matrix = %d x %d\n", dimx, dimy);
  fprintf (acode_file, "Thresholds =");
  for (i = 0; i < n_thresholds; i ++)
    fprintf (acode_file, " %d", th[i]);
  fprintf (acode_file, "\n");
  fprintf (acode_file, "Features = %d\n", n_features);
  for (i = 0; i < n_chars; i ++) {
    if (cod[i].obs) continue;
    fprintf (acode_file, "CHAR %c (%d %d)\n",
      cod[i].ch, cod[i].n_stk, cod[i].frame);
  }
  fclose (acode_file);
  return (TRUE);
} bool save_code ()
/* It saves code to file */
{
  FILE *code_file;
  register int i;
  int dimx = COLS, dimy = ROWS;
  int n_chars_eff = n_chars - n_chars_purged;
  if (cod == NULL) return (FALSE);
  if (features == NULL) return (FALSE);
  code_file = fopen (code_fname, "wb");
  if (code_file == NULL) return (FALSE);
  fwrite (&dimx, sizeof (int), 1, code_file);
  fwrite (&dimy, sizeof (int), 1, code_file);
  fwrite (&n_thresholds, sizeof (int), 1, code_file);
  fwrite (th, sizeof (int), n_thresholds, code_file);
  fwrite (&n_features, sizeof (int), 1, code_file);
  for (i = 0; i < n_features; i ++)
    fwrite (features[i], sizeof (row), ROWS, code_file);
  fwrite (&n_chars_eff, sizeof (int), 1, code_file);
  for (i = 0; i < n_chars; i ++) {
```

```
    if (cod[i].obs) continue;
    fwrite (&cod[i].ch, sizeof (char), 1, code_file);
    fwrite (&cod[i].n_stk, sizeof (int), 1, code_file);
    fwrite (&cod[i].frame, sizeof (int), 1, code_file);
    fwrite (cod[i].var, sizeof (var_xy), max (COLS, ROWS), code_file);
    fwrite (cod[i].ftr, sizeof (byte), n_features, code_file);
  }
  fclose (code_file);
  return (TRUE);
} bool load_code ()
/* It loads code from file */
{
  FILE *code_file;
  register int i;
  int dimx, dimy;
  code_file = fopen (code_fname, "rb");
  if (code_file == NULL) return (FALSE);
  fread (&dimx, sizeof (int), 1, code_file);
  fread (&dimy, sizeof (int), 1, code_file);
  if ((dimx != COLS) || (dimy != ROWS)) {
    fclose (code_file);
    return (FALSE);
  }
  fread (&n_thresholds, sizeof (int), 1, code_file);
  fread (th, sizeof (int), n_thresholds, code_file);
  fread (&n_features, sizeof (int), 1, code_file);
  if (! alloc_features ()) return (FALSE);
  for (i = 0; i < n_features; i ++)
    fread (features[i], sizeof (row), ROWS, code_file);
  fread (&n_chars, sizeof (int), 1, code_file);
  if (! alloc_code ()) return (FALSE);
  for (i = 0; i < n_chars; i ++) {
    fread (&cod[i].ch, sizeof (char), 1, code_file);
    fread (&cod[i].n_stk, sizeof (int), 1, code_file);
    fread (&cod[i].frame, sizeof (int), 1, code_file);
    fread (cod[i].var, sizeof (var_xy), max (COLS, ROWS), code_file);
    fread (cod[i].ftr, sizeof (byte), n_features, code_file);
    cod[i].obs = FALSE;
  }
  fclose (code_file);
  return (TRUE);
} char test_char (char_struct *chs)
/* It tests char stored in video structure chs and return identifier */
{
  register int i;
  int min_delta, ch = -1;
  bool space = TRUE;
  if (chs->frame > 7) return (chs->id_out);
  for (i = 0; i < ROWS; i ++)
    if (chs->mat[i] != 0) {
      space = FALSE;
      break;
    }
  if (space) return (chs->id_out = ' ');
```

```
for (i = 0; i < n_features; i ++)
  test_f[i] = threshold (c_bits (chs->mat, features[i]));
min_delta = MAXINT;
for (i = 0; i < n_chars; i ++) {
  register int cmp;
  if (chs->frame != cod[i].frame) continue;
  cmp = cmp_strokes (chs->n_stk, cod[i].n_stk);
  cmp += cmp_vars (chs->var, cod[i].var);
/* if (cmp>10) continue;          */
  cmp = cmp_features (test_f, cod[i].ftr, cmp, min_delta);
  if (cmp < min_delta) {
    min_delta = cmp;
    ch = i;
  }
}
if (ch == -1) return (chs->id_out = ' ');
else return (chs->id_out = cod[ch].ch);
} void make_vars_xy (char_struct *chs)
/* It make intersections vars from matrix of video char chs */
{
  register int i, j;
  bool bm[ROWS][COLS];
  row w, mask = (row) 1 << (COLS - 1);
  for (i = 0; i < ROWS; i ++) {
    w = chs->mat[i];
    for (j = 0; j < COLS; w <<= 1, j ++)
      bm[i][j] = ((w & mask) != 0);
  }
  for (i = 0; i < ROWS; i ++) {
    byte var = (bm[i][0] ? 1 : 0);
    for (j = 1; j < COLS; j ++)
      if (!bm[i][j - 1] && bm[i][j]) var ++;
    chs->var[i].y = min (var, 4);
  }
  for (j = 0; j < COLS; j ++) {
    byte var = (bm[0][j] ? 1 : 0);
    for (i = 1; i < ROWS; i ++)
      if (!bm[i - 1][j] && bm[i][j]) var ++;
    chs->var[j].x = min (var, 4);
  }
}
```

\*\*\* MATRIX.C \*\*\*

```c
#include "options.h"

#include <stdio.h>
#include <stdlib.h>
#include <dir.h>
#include <values.h>
include <math.h> include "typedef.h"
include "matrix.h"

extern int max_chars;
extern char_struct cs[];
extern int n_strokes;
extern stroke_type *strokes;
extern coord *points;

int frame_th[2];                /* Framing thresholds for chars */
int frame_band[2] = { 5, 10 };           /* Bands for framing */
int frame_ln[2] = { 35, 68 };        /* Levels % for framing lines */ static int frame_punct = 50;      /* Level % for frame of punctuation */
static int frame_band_punct = 3;   /* Lower framing band for punctuation */ int asp_x = 400, asp_y = 400;           /* Aspect % in scaling */
int y_center_fact = 4;                  /* Center for scaling */
int thresh_fact = 8;                 /* Threshold for scaling */ int punct_th_x = 15, punct_th_y = 15;   /* Threshold for punctuation */
int comma_th_x = 3, comma_th_y = 3;          /* Threshold for comma */
int punct_weight = 100;     /* Punctuation weight % for comma / point rec */ static int make_frame (cbox *bb, cbox *bc)
/* It returns the frame of char which box is bc related to a video box bb */
{
  float af[2];
  int frame = 0;
  af[0] = (100.0 * (bc->min.y - bb->min.y)) / (bb->max.y - bb->min.y);
  af[1] = (100.0 * (bc->max.y - bb->min.y)) / (bb->max.y - bb->min.y);
  if ((af[0] > frame_th[0]) && (af[0] < frame_th[1])) frame = 2;
  if ((af[1] > frame_th[0]) && (af[1] < frame_th[1])) frame = 2;
  if ((af[0] <= frame_th[0]) && (af[1] >= frame_th[1])) frame = 2;
  if (af[0] <= frame_th[0]) frame += 1;
  if (af[1] >= frame_th[1]) frame += 4;
  return (frame);
} static void cbox2array (cbox b, coord pt[4])
/* It transform a box structure in an equivalent vector coord structure */
{
  pt[0].x = b.min.x; pt[0].y = b.min.y;
  pt[1].x = b.min.x; pt[1].y = b.max.y;
  pt[2].x = b.max.x; pt[2].y = b.max.y;
```

```
  pt[3].x = b.max.x; pt[3].y = b.min.y;
} static bool intersect_box (cbox b1, cbox b2)
/* It verify if two boxes b1 and b2 have a common area */
{
  register int i;
  coord pt[4];
  cbox2array (b1, pt);
  for (i = 0; i < 4; i ++) if (pt_in_box (pt[i], b2)) return (TRUE);
  cbox2array (b2, pt);
  for (i = 0; i < 4; i ++) if (pt_in_box (pt[i], b1)) return (TRUE);
  return (FALSE);
} static void merge_2box (cbox *bres, cbox b1, cbox b2)
/* It merges in bres two box b1 and b2 */
{
  bres->min.x = min (b1.min.x, b2.min.x);
  bres->max.x = max (b1.max.x, b2.max.x);
  bres->min.y = min (b1.min.y, b2.min.y);
  bres->max.y = max (b1.max.y, b2.max.y);
} static int merge_punct_box (cbox b[2], int cas)
/* It merges in a vector of two (others are ignored) boxes the strokes */
/* associated to the char of index cas */
{
  register int i, j;
  int ci = 0, ci_end;
  cbox punct_box[8];
  bool bool_box[8];
  for (i = 0; i < 2; i ++) {
    b[i].min.x = 0; b[i].max.x = 0;
    b[i].min.y = 0; b[i].max.y = 0;
  }
  for (i = 0; i < n_strokes; i ++) {
    if (strokes[i].char_idx != cas) continue;
    punct_box[ci] = strokes[i].box;
    bool_box[ci] = TRUE;
    ci ++;
  }
  ci_end = ci;
  for (i = 0; i < ci - 1; i ++) {
    if (! bool_box[i]) continue;
    for (j = i + 1; j < ci; j ++) {
      if (! bool_box[j]) continue;
      if (intersect_box (punct_box[i], punct_box[j])) {
          merge_2box (&punct_box[i], punct_box[i], punct_box[j]);
          bool_box[j] = FALSE;
          ci_end --;
      }
    }
  }
  for (i = j = 0; (i < ci) && (j < 2); i ++)
    if (bool_box[i]) {
      b[j] = punct_box[i];
```

```
    j ++;
  }
  return (ci_end);
} static char rec_comma_or_point (cbox bc, cbox bb)
/* It returns ',' or '.' or ' ' (char is not punctuation) */
/* related to video box bb and stroke group box bc */
{
  float af[2];
  float score;
  int mid_th, frame_th_punct = frame_ln[1] + frame_band_punct;
  af[0] = (100.0 * (bc.min.y - bb.min.y)) / (bb.max.y - bb.min.y);
  af[1] = (100.0 * (bc.max.y - bb.min.y)) / (bb.max.y - bb.min.y);
  mid_th = ((frame_ln[0] + frame_ln[1]) * frame_punct) / 100;
  if (af[0] < mid_th) return (' ');
  score = ((float) punct_weight * (af[1] - frame_th_punct)) / 100;
  score += (bc.max.x - bc.min.x) - comma_th_x;
  score += (bc.max.y - bc.min.y) - comma_th_y;
  return (score > 0 ? ',' : '.');
} static bool is_upper_point (cbox bc, cbox bb)
/* It recognize the upper point in ':' or ';' */
{
  float af;
  af = (100.0 * (bc.min.y - bb.min.y)) / (bb.max.y - bb.min.y);
  if (af < frame_th[0]) return (FALSE);
  if ((bc.max.x - bc.min.x) > comma_th_x) return (FALSE);
  if ((bc.max.y - bc.min.y) > comma_th_y) return (FALSE);
  return (TRUE);
} static char recognize_punctuation (cbox mb[2], int n_box, cbox cb)
/* It recognize a punctuation char from a number n_stk of boxes in mb */
{
  if ((n_box < 1) || (n_box > 2)) return (' ');
  if (n_box == 1)
    return (rec_comma_or_point (mb[0], cb));
  else {
    char rec;
    if (is_upper_point (mb[0], cb)) {
      rec = rec_comma_or_point (mb[1], cb);
      if (rec == '.') return (':');
      if (rec == ',') return (';');
      return (' ');
    }
    if (is_upper_point (mb[1], cb)) {
      rec = rec_comma_or_point (mb[0], cb);
      if (rec == '.') return (':');
      if (rec == ',') return (';');
      return (' ');
    }
  }
  return (' ');
}
```

```
void calc_box_stroke (cbox *box, int first, int last)
/* It calculate the rectangle in which a strokes, defined by first and */
/* last point is in */
{
  register i;
  box->min.x = box->min.y = MAXINT;
  box->max.x = box->max.y = 0;
  for (i = first; i <= last; i ++) {
    if (points[i].x < box->min.x) box->min.x = points[i].x;
    if (points[i].x > box->max.x) box->max.x = points[i].x;
    if (points[i].y < box->min.y) box->min.y = points[i].y;
    if (points[i].y > box->max.y) box->max.y = points[i].y;
  }
} void make_matrix (bool proc_punct)
/* It performs preprocessing */
/* The most important routine is the construction of char matrices */
/* from strokes and points vectors */
/* If proc_punct is TRUE the function accepts punctuation */
{
  static int count[ROWS][COLS];
  int x_offs, y_offs, pxl_fact;
  long x_fact, y_fact;
  register int i, j;
  int r, c, cas, k, pt;
  cbox b;
  bool space, punctuation;
  for (cas = 0; cas < max_chars; cas ++) {
    b.min.x = b.min.y = MAXINT;
    b.max.x = b.max.y = 0;
    for (i = 0; i < ROWS; i ++)
      for (j = 0; j < COLS; j ++)
          count[i][j] = 0;
    space = TRUE;
    punctuation = proc_punct;
    for (i = 0; i < n_strokes; i ++) {
      if (strokes[i].char_idx != cas) continue;
      if ((strokes[i].box.max.x - strokes[i].box.min.x) > punct_th_x)
          punctuation = FALSE;
      if ((strokes[i].box.max.y - strokes[i].box.min.y) > punct_th_y)
          punctuation = FALSE;
      if (strokes[i].box.min.x < b.min.x) b.min.x = strokes[i].box.min.x;
      if (strokes[i].box.max.x > b.max.x) b.max.x = strokes[i].box.max.x;
      if (strokes[i].box.min.y < b.min.y) b.min.y = strokes[i].box.min.y;
      if (strokes[i].box.max.y > b.max.y) b.max.y = strokes[i].box.max.y;
      space = FALSE;
    }
    if (space) {
      cs[cas].frame = 0;
      for (j = 0; j < ROWS; j ++) cs[cas].mat[j] = 0;
      continue;
    }
    cs[cas].frame = make_frame (&cs[cas].box_in, &b);
    if (cs[cas].frame % 2) punctuation = FALSE;
    if (punctuation) {
      cbox mb[2];
      int n_box;
```

```
char punct_rec;
n_box = merge_punct_box (mb, cas);
punct_rec = recognize_punctuation (mb, n_box, cs[cas].box_in);
if (punct_rec != ' ') {
    for (j = 0; j < ROWS; j ++)
        cs[cas].mat[j] = 0;
    cs[cas].id_out = punct_rec;
    cs[cas].frame = 8;
    cs[cas].n_stk = n_box;
    continue;
  }
}
b.min.x <<= 4; b.min.y <<= 4;
b.max.x <<= 4; b.max.y <<= 4;
x_fact = b.max.x - b.min.x + 1;
y_fact = b.max.y - b.min.y + 1;
x_offs = (x_fact + (COLS >> 1)) / COLS;
y_offs = (y_fact + (ROWS >> 1)) / ROWS;
if (x_offs > y_offs) {
  if (((asp_x * y_fact) / 100) <= x_fact)
      y_fact = x_fact;
  y_offs = (b.min.y + b.max.y - y_fact) / 2;
  x_offs = b.min.x - 1;
}
else {
  if (((asp_y * x_fact) / 100) <= y_fact)
    x_fact = y_fact;
  x_offs = (b.min.x + b.max.x - x_fact) / 2;
  y_offs = b.min.y - 1;
}
if (x_fact < 1) x_fact = 1;
if (y_fact < 1) y_fact = 1;
for (i = 0; i < n_strokes; i ++)
  if (strokes[i].char_idx == cas) {
    coord t;
    pt = strokes[i].first;
    t.x = points[pt ++].x << 4;
    t.y = points[pt ++].y << 4;
    r = ((t.y - y_offs) * ROWS) / y_fact;
        c = COLS - ((t.x - x_offs) * COLS) / x_fact;
        if (r >= ROWS) r = ROWS - 1;
        if (c > 0) c --;
        count[r][c] ++;
    while (pt <= strokes[i].last) {
        int numfilpts, xit, yit, xr, yr, pn, qn;
        xr = (points[pt].x << 4) - t.x;
        yr = (points[pt].y << 4) - t.y;
        numfilpts = max (abs (xr), abs (yr));
      if (numfilpts < 1) numfilpts = 1;
      xit = xr / numfilpts;
      xr = xr % numfilpts;
      yit = yr / numfilpts;
      yr = yr % numfilpts;
      pn = qn = 0;
        for (k = 0; k < numfilpts; k ++) {
          t.x += xit;
          t.y += yit;
          pn += xr;
          qn += yr;
          if (xr > 0) {
```

```
            if (pn >= numfilpts) {
              t.x ++;
                pn -= numfilpts;
            }
          }
          else
          if (pn <= -numfilpts) {
              t.x --;
                pn += numfilpts;
          }
          if (yr > 0) {
            if (qn >= numfilpts) {
                t.y ++;
                qn -= numfilpts;
            }
          }
          else
              if (qn <= -numfilpts) {
                t.y--;
                qn += numfilpts;
              }
          r = ((t.y - y_offs) * ROWS) / y_fact;
          c = COLS - ((t.x - x_offs) * COLS) / x_fact;
          if (r >= ROWS) r = ROWS - 1;
          if (c > 0) c --;
          count[r][c] ++;
        }
        pt ++;
      }
    }
    for (i = 1, k = 0, pxl_fact = 0; i < ROWS; i ++)
      for (j = 1; j < COLS; j ++)
        if (count[i][j] > 0) {
          k ++;
          pxl_fact += count[i][j];
        }
    k *= thresh_fact;
    if (pxl_fact != 0) {
      pxl_fact = (pxl_fact + (k >> 1)) / k;
      for (i = 0; i < ROWS; i++) {
        row bit = (row) 1, mat_row = (row) 0;
        for (j = 0; j < COLS; j ++) {
          if (count[i][j] > pxl_fact)
            mat_row |= bit;
            bit <<= 1;
        }
        cs[cas].mat[i] = mat_row;
      }
    }
    make_vars_xy (&cs[cas]);
  }
}
```

```
*** ASMESI.CFG ***

FRAMING_LINES 32 65
FRAMING_BANDS 10 5
THRESHOLDS_LIST 2 3 6
STROKES_WEIGHT 15
INTERSECTIONS_WEIGHT 2
```

\*\*\* ASMESI.LRN \*\*\*

```
A 3
B 3
C 3
D 3
E 3
F 3
G 3
H 3
I 3
J 3
K 3
L 3
M 3
N 3
O 3
P 3
Q 3 7
R 3
S 3
T 3
U 3
V 3
W 3
X 3
Y 3
Z 3
a 2
b 3
c 2
d 3
e 2
f 3 7
g 6
h 3
i 3
j 6 7
k 2 3
l 3
m 2
n 2
o 2
p 6
q 6
r 2
s 2
t 3
u 2
v 2
w 2
x 2
y 6
z 2
1 3
2 3
3 3
4 3
5 3
```

```
6 3
7 3
8 3
9 3
' 1
` 1
^ 1
" 1
+ 2
- 2
* 2
/ 2
= 2
< 2
> 2
! 3
? 3
$ 3
% 3
[ 3
] 3
•
```

We claim:

1. A method for recognising a script written character comprising the steps of:

entering the character using character enter means into a frame in a predetermined manner dependent on the character and producing a frame code indicative of at least one feature of the character, said frame code forming a topological feature;

digitizing the character;

storing the digitized character;

extracting topological features of the character and including the frame code as one of the topological features;

comparing the topological features of the character with the topological features of a plurality of reference characters defining a set of reference characters stored in a memory, each reference character of the set corresponding with a specific character; and performing a logic process to determine which reference character of the set of reference characters has topological features most closely corresponding to the topological features of the digitized character, thereby recognising the script written character.

2. A method for recognising a script written character comprising the steps of:

entering the character using character enter means;

digitizing the character;

storing the digitized character;

extracting topological features of the character;

comparing the topological features of the character with the topological features of a plurality of reference characters defining a set of reference characters stored in a memory, each reference character of the set corresponding with a specific character; and performing a logic process to determine which reference character of the set of reference characters has topological features most closely corresponding to the topological features of the digitized character by evaluating a score Sj for each of the reference characters (Ncar) given by:

$$Sj = SW*|S - Sj| + \sum_{i=1}^{99} |fi - fij| + IW* \sum_{i=1}^{32} |Ni - Nij|$$

where:

S=stroke number of the input character,

Sj=stroke number of the j-th reference character, fi=response of the i-th feature to the input character, fij=response of the i-th feature to the j-th reference character, Ni=number of intersections of the i-th line with the input character, Nij=number of intersections of the i-th line with the j-th reference character, SW=stroke weight, and IW=intersection weight, and identifying the reference character with the lowest score Sj as the character that was entered as the script written character.

3. Apparatus for recognizing a script written character comprising:

character entering means for entering and receiving the characters;

digitizing means for digitizing the characters;

storage means for storing the digitized characters;

topological feature extracting means for extracting topological features representative of respective characters;

means for comparing the topological features of a character with the topological features of a plurality of reference characters defining a set of reference characters, each reference character corresponding to a specific character; and logic means for identifying which reference character of the set of reference characters has topological features most closely corresponding to the topological features of the digitized character, wherein the logic means evaluates a score Sj for each of the reference characters (Ncar) and identifies the reference character with the lowest score as that corresponding to the script written character; and wherein the score Sj is given by:

$$Sj = SW*|S - Sj| + \sum_{i=1}^{99} |fi - fij| + IW* \sum_{i=1}^{32} |Ni - Nij|$$

where:

S=stroke number of the input character,

Sj=stroke number of the j-th reference character, fi=response of the i-th feature to the input character, fij=response of the i-th feature to the j-th reference character, Ni=number of intersections of the i-th line with the input character, Nij=number of intersections of the i-th line with the j-th reference character, SW=stroke weight, and IW=intersection weight.

4. Apparatus according to claim 3, wherein an interface is provided between the apparatus and a computer such that the interface passes the identified characters to the computer thereby forming the instructions for the computer.

5. A computer based product including apparatus according to claim 3 and an interface between said apparatus and said computer for passing instructions to the computer from the apparatus.

6. A method for recognizing a script written character from a group of script written characters to be recognized comprising the steps of:

entering the character using character enter means;

digitizing the character;

storing the digitized character;

assigning a code to the character based upon its general appearance attributes as written in the form of a frame number, wherein the frame number is representative of at least one character, but not all of the characters included in the group of characters to be potentially recognized;

providing a plurality of reference characters having respective codes in the form of respective frame numbers and topological features defining a set of reference characters, each reference character of the set corresponding with a specific character of the group of characters to be potentially recognized;

eliminating reference characters of the set of reference characters which have frame numbers different from the frame number assigned to the character;

extracting topological features of said character;

comparing the topological features of the character with the topological features of the remaining reference characters of the set of reference characters; and performing a logic process to determine which reference character of the set of reference characters has topological features most closing corresponding to the topological features of the digitized character, thereby recognizing the script written character.

7. A method as set forth in claim 6, wherein entering the character using character enter means is accomplished by entering the character into a frame having a top frame portion, a middle frame portion, and a bottom frame portion;

assigning a different score to the respective top, middle, and bottom frame portions;

lower case script characters of relatively short height as compared to other script characters comprising a first character type and being enterable in the middle frame portion;

taller lower case characters having a larger vertical size than the smaller lower case characters comprising a second character type and being enterable in the top and middle frame portions;

lower case characters having a tail comprising a third character type and being enterable such that the tail extends into the bottom frame portion;

upper case characters and numbers comprising a fourth character type and being enterable in the top and middle frame portions;

miscellaneous other characters being enterable in positions corresponding to one of the character types; and determining the frame number to be assigned to the character based upon the scores of the frame portions into which the character extends.

* * * * *